(12) United States Patent
Carpenter et al.

(10) Patent No.: US 9,318,938 B2
(45) Date of Patent: Apr. 19, 2016

(54) ELECTRIC MACHINE-MODULAR

(75) Inventors: Nicholas Carpenter, Towcester (GB);
Simon Dowson, Towcester (GB); Tim Woolmer, Oxford (GB); Chee Yeow Leong, Oxford (GB); William Treharne, Oxford (GB); Malcolm McCulloch, Oxford (GB)

(73) Assignee: ISIS Innovation Ltd., Oxfordshire (GB)

( * ) Notice: Subject to any disclaimer, the term of this patent is extended or adjusted under 35 U.S.C. 154(b) by 567 days.

(21) Appl. No.: 13/148,897

(22) PCT Filed: Feb. 12, 2010

(86) PCT No.: PCT/GB2010/050236
§ 371 (c)(1),
(2), (4) Date: Aug. 10, 2011

(87) PCT Pub. No.: WO2010/092402
PCT Pub. Date: Aug. 19, 2010

(65) Prior Publication Data
US 2011/0309726 A1    Dec. 22, 2011

(30) Foreign Application Priority Data

Feb. 13, 2009  (GB) .................................. 0902393.8

(51) Int. Cl.
*H02K 5/16*   (2006.01)
*H02K 7/08*   (2006.01)
(Continued)

(52) U.S. Cl.
CPC .............. *H02K 21/24* (2013.01); *H02K 1/182* (2013.01); *H02K 1/28* (2013.01); *H02K 5/1282* (2013.01);
(Continued)

(58) Field of Classification Search
CPC ... H02K 5/156; H02K 5/1677; H02K 5/1737; H02K 7/086; H02K 7/088; H02K 1/148; H02K 1/182; H02K 3/24; H02K 16/00; H02K 16/02; H02K 1/20; H02K 1/2793; H02K 1/28; H02K 1/30; H02K 9/197; H02K 21/24; H02K 5/16; H02K 7/0885
USPC .................................... 310/216.109, 114, 266
See application file for complete search history.

(56) References Cited

U.S. PATENT DOCUMENTS 2,606,946 A   8/1952  Fisher
3,150,277 A   9/1964  Chubb et al.
(Continued)

FOREIGN PATENT DOCUMENTS

DE     19600612    7/1997
EP     0484548     5/1992
(Continued)

OTHER PUBLICATIONS

Kaneko et al., JP2005261083 Machine Translation, Sep. 2005.*
(Continued)

*Primary Examiner* — Quyen Leung
*Assistant Examiner* — Eric Johnson
(74) *Attorney, Agent, or Firm* — Meunier Carlin & Curfman LLC

(57) ABSTRACT

An electric machine (100) comprises a stator (112) and a rotor (114*a, b*) mounted for rotation about a rotor axis (120) with respect to the stator. Permanent magnets (124*a, b*) are carried by the rotor. The rotor has an output (190). The stator has coils (122) wound on stator bars (116) for interaction with the magnets. The rotor has two stages (114*a,b*) arranged one at either end of the stator bars, with two air gaps (126*a,b*) between the ends of the bars and the rotor stages. An annular housing (102, 142*a, b,* 146) retains and mounts the stator. A bearing (164*a, b*) is between the rotor and stator, the rotor being hollow around said rotor axis. There are two significant magnetic flux paths (30,30') of the motor. The first passes between adjacent coils in a circuit on a substantially circumferential plane with respect to the axis (120). A second path 30' is in an axial plane, passing around the bearing. The stator coils are spaced around the rotor axis and approach the rotor axis no closer than a first, stator radius ($R_1$) of the stator. The bearing comprises rolling elements rolling on a surface of the rotor that is no closer to the rotor axis than a second, rotor radius (r), which rotor radius is between 60% and 90% of the stator radius.

30 Claims, 10 Drawing Sheets

(51) Int. Cl.
*H02K 21/24* (2006.01)
*H02K 1/18* (2006.01)
*H02K 1/28* (2006.01)
*H02K 5/128* (2006.01)
*H02K 5/20* (2006.01)
*H02K 9/197* (2006.01)
*H02K 1/14* (2006.01)
*H02K 3/24* (2006.01)

(52) U.S. Cl.
CPC ............... *H02K 5/20* (2013.01); *H02K 7/083* (2013.01); *H02K 9/197* (2013.01); *H02K 1/148* (2013.01); *H02K 3/24* (2013.01)

(56) References Cited

U.S. PATENT DOCUMENTS

| | | | |
|---|---|---|---|
| 3,217,193 A | 11/1965 | Rayner | |
| 3,413,503 A * | 11/1968 | Parker | 310/268 |
| 4,082,971 A | 4/1978 | Miyake et al. | |
| 4,435,662 A | 3/1984 | Tawse | |
| 4,447,750 A * | 5/1984 | Howlett et al. | 310/89 |
| 4,464,592 A | 8/1984 | Major | |
| 5,334,899 A * | 8/1994 | Skybyk | 310/268 |
| 5,345,777 A * | 9/1994 | Sekino et al. | 62/244 |
| 5,355,039 A | 10/1994 | Couture | |
| 5,394,040 A | 2/1995 | Khanh | |
| 5,517,072 A | 5/1996 | Hildebrandt | |
| 5,578,879 A | 11/1996 | Heidelberg et al. | |
| 5,894,902 A | 4/1999 | Cho | |
| 5,910,697 A | 6/1999 | Sromin et al. | |
| 5,982,070 A | 11/1999 | Caamano | |
| 6,100,615 A | 8/2000 | Birkestrand | |
| 6,286,616 B1 | 9/2001 | Kutter | |
| 6,304,011 B1 | 10/2001 | Pullen et al. | |
| 6,355,996 B1 | 3/2002 | Birkestrand | |
| 6,488,486 B1 * | 12/2002 | Debleser | 417/423.8 |
| 6,515,384 B1 | 2/2003 | Kikuchi | |
| 6,720,688 B1 | 4/2004 | Schiller | |
| 6,849,982 B2 * | 2/2005 | Haydock et al. | 310/164 |
| 6,903,471 B2 | 6/2005 | Arimitsu et al. | |
| 6,922,004 B2 * | 7/2005 | Hashimoto et al. | 310/268 |
| 7,002,277 B2 | 2/2006 | Yamamoto et al. | |
| 7,135,800 B2 | 11/2006 | Yamada et al. | |
| 7,227,286 B2 | 6/2007 | Kudo et al. | |
| 7,411,325 B1 | 8/2008 | Gabrys | |
| 7,445,067 B2 | 11/2008 | Marsh | |
| 7,728,447 B2 | 6/2010 | Becquerelle et al. | |
| 8,264,107 B2 * | 9/2012 | Jee | 310/54 |
| 2004/0145252 A1 | 7/2004 | Arimitsu et al. | |
| 2004/0164641 A1 | 8/2004 | Yamada et al. | |
| 2004/0174087 A1 | 9/2004 | Heidrich | |
| 2005/0035676 A1 | 2/2005 | Rahman et al. | |
| 2005/0140233 A1 * | 6/2005 | Kojima | F04D 25/0653 310/156.37 |
| 2005/0140244 A1 | 6/2005 | Yamada et al. | |
| 2006/0091761 A1 | 5/2006 | Lafontaine | |
| 2006/0103263 A1 | 5/2006 | Naito et al. | |
| 2006/0113856 A1 * | 6/2006 | Tanno et al. | 310/156.37 |
| 2006/0279150 A1 * | 12/2006 | Kojima et al. | 310/91 |
| 2007/0018520 A1 | 1/2007 | Kaneko et al. | |
| 2007/0046124 A1 | 3/2007 | Aydin et al. | |
| 2007/0138876 A1 | 6/2007 | Evans et al. | |
| 2007/0199339 A1 | 8/2007 | Ishihara et al. | |
| 2008/0099258 A1 | 5/2008 | Berhan | |
| 2009/0025830 A1 | 1/2009 | Uozumi et al. | |
| 2009/0218540 A1 | 9/2009 | Takami et al. | |
| 2011/0156519 A1 | 6/2011 | Wang et al. | |

FOREIGN PATENT DOCUMENTS

| | | |
|---|---|---|
| EP | 1292004 A1 | 3/2003 |
| EP | 1739810 | 1/2007 |
| FR | 2823382 | 10/2002 |
| GB | 2379093 | 2/2003 |
| JP | S50-88510 | 7/1975 |
| JP | 62201034 | 9/1987 |
| JP | 63209455 | 8/1988 |
| JP | 05185847 | 1/1992 |
| JP | 04359653 | 12/1992 |
| JP | 05091696 | 4/1993 |
| JP | H1-178310 | 7/1999 |
| JP | 2002281722 | 9/2002 |
| JP | 2003088032 | 3/2003 |
| JP | 2004274838 | 9/2004 |
| JP | 2004312984 | 11/2004 |
| JP | 2005151725 | 6/2005 |
| JP | 2005224054 | 8/2005 |
| JP | 2005253188 | 9/2005 |
| JP | 2005261083 A * | 9/2005 ............... H02K 9/19 |
| JP | 2006014522 | 1/2006 |
| JP | 2006033965 A | 2/2006 |
| JP | 2006248417 | 9/2006 |
| JP | 2006304474 | 11/2006 |
| JP | 2007060748 | 3/2007 |
| JP | 2007143365 | 6/2007 |
| JP | 2008079397 A | 4/2008 |
| JP | 2008131684 | 6/2008 |
| SE | 384766 | 5/1976 |
| SU | 551763 | 3/1977 |
| SU | 955379 | 8/1982 |
| WO | 9807227 | 2/1998 |
| WO | 03094327 A1 | 11/2003 |
| WO | 2006066740 A1 | 6/2006 |
| WO | 2007141489 | 12/2007 |
| WO | 2008032430 | 3/2008 |
| WO | WO 2008091035 A1 * | 7/2008 ............. H02K 21/24 |
| WO | 2010092400 | 8/2010 |
| WO | 2010092402 A1 | 8/2010 |
| WO | 2010092403 | 8/2010 |
| WO | 2010119281 | 10/2010 |

OTHER PUBLICATIONS

International Preliminary Report on Patentability and Written Opinion, dated Aug. 16, 2011, received from the International Bureau of WIPO.
International Search Report, dated Jul. 9, 2010, received from the European Patent Office.
Woolmer, T.J. et al., "Analysis of the Yokeless and Segmented Armature Machine", International Electric Machines and Drives Conference (IEMDC), Antalya, Turkey, May 3-5, 2007, 7 pages.
Notice of Allowance in U.S. Appl. No. 13/148,863, dated Nov. 21, 2014.
Advisory Action issued in U.S. Appl. No. 13/148,871 on Sep. 22, 2014.
Advisory Action issued in U.S. Appl. No. 14/049,322 on Nov. 6, 2014.
English Translation of Japanese Office Action issued Feb. 25, 2014, in related Japanese Application No. 2011-549676.
English Translation of Japanese Office Action issued Feb. 25, 2014, in related Japanese Application No. 2011-549678.
English Translation of Japanese Office Action issued Mar. 18, 2014 for Japanese Application No. 2012-505237.
Final Office Action issued in U.S. Appl. No. 14/049,322 on Aug. 20, 2014.
Final Office Action issued in U.S. Appl. No. 13/148,871 dated Jun. 2, 2014.
International Preliminary Report on Patentability and Written Opinion, dated Oct. 18, 2011, received in International Application No. PCT/GB2010/050613.
International Preliminary Report on Patentability and Written Opinion, dated Aug. 16, 2011, received in International Application No. PCT/GB2010/050234.
International Preliminary Report on Patentability and Written Opinion, dated Aug. 16, 2011, received in International Application No. PCT/GB2010/050237.
International Search Report, dated Mar. 17, 2011, received in International Application No. PCT/GB2010/050613.
International Search Report, dated May 6, 2011, received in International Application No. PCT/GB2010/050234.

(56) References Cited

OTHER PUBLICATIONS

International Search Report, dated May 6, 2011, received in International Application No. PCT/GB2010/050237.
Office Action for U.S. Appl. No. 14/049,322 dated Jan. 31, 2014.
Office Action for U.S. Appl. No. 13/148,863, dated Apr. 23, 2014.
Office Action for U.S. Appl. No. 13/148,871, dated Dec. 6, 2013.
Related U.S. Appl. No. 13/148,863, filed Aug. 10, 2011.
Related U.S. Appl. No. 13/258,839, filed Sep. 22, 2011.
Related U.S. Appl. No. 13/148,871, filed Aug. 10, 2011.
English Translation of Japanese Office Action issued Mar. 18, 2014, in related Japanese Application No. 2011-549677.
Office Action issued in related JP Application No. 2011-549676 issued Oct. 28, 2014.
Office Action received in related U.S. Appl. No. 13/148,871 on Jan. 2, 2015.
Machine Translation of Foreign Reference JP2006033965.

* cited by examiner

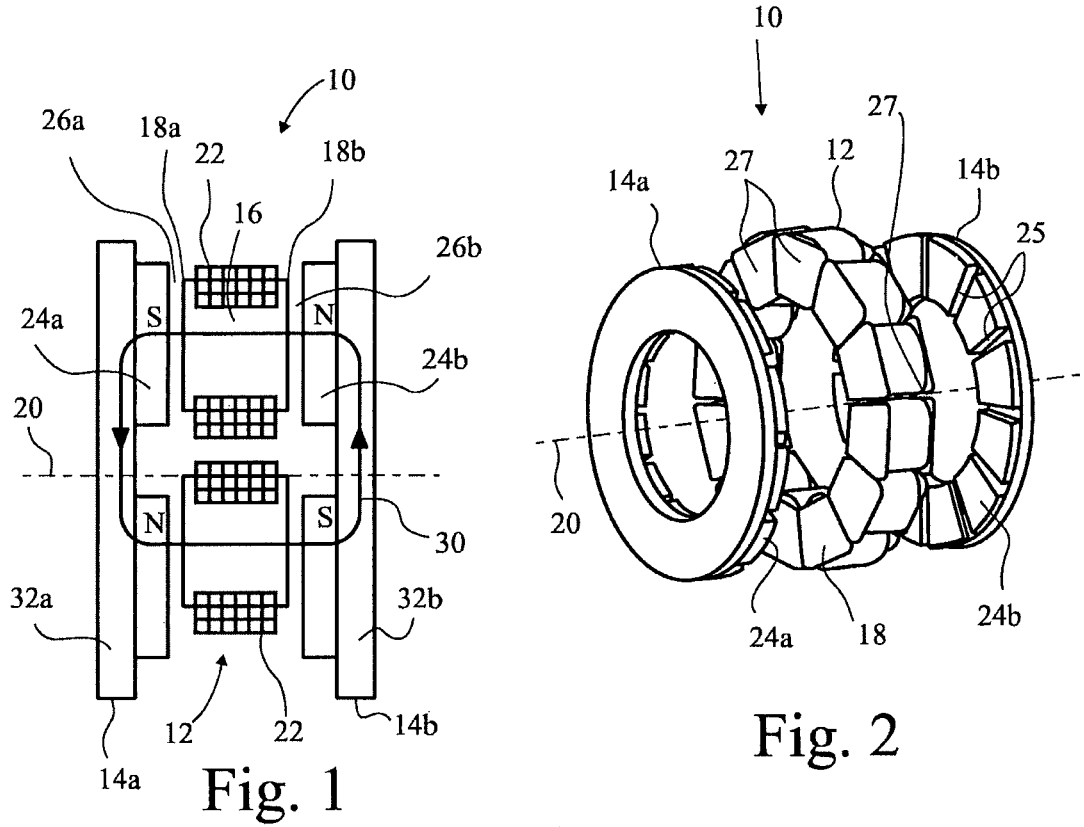
Fig. 1
Fig. 2
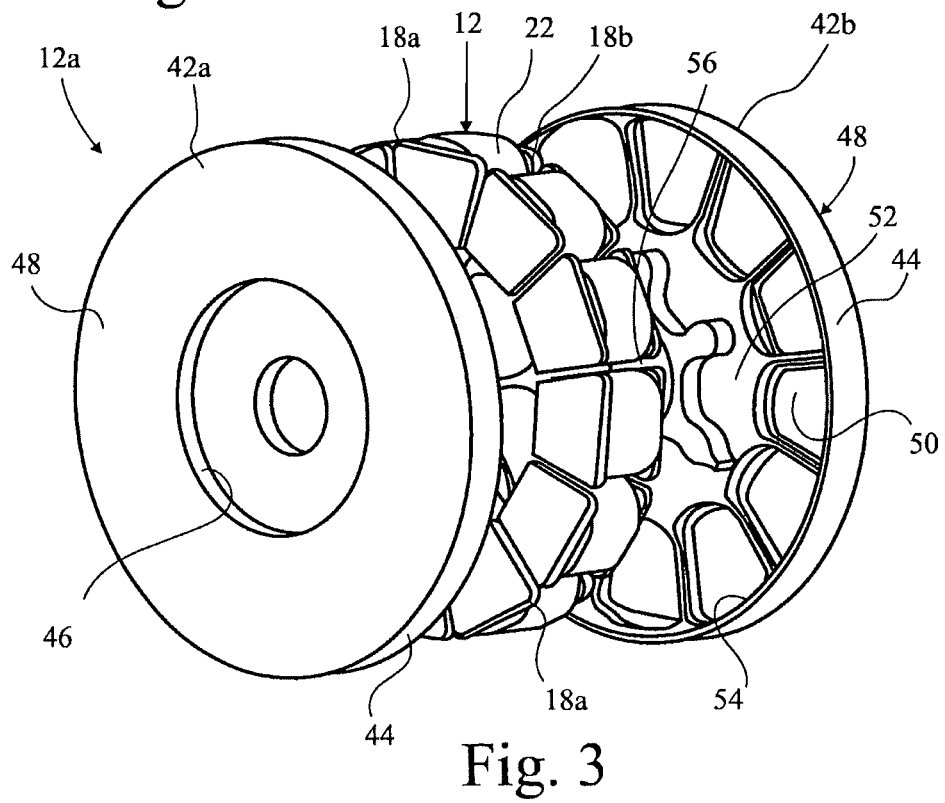
Fig. 3

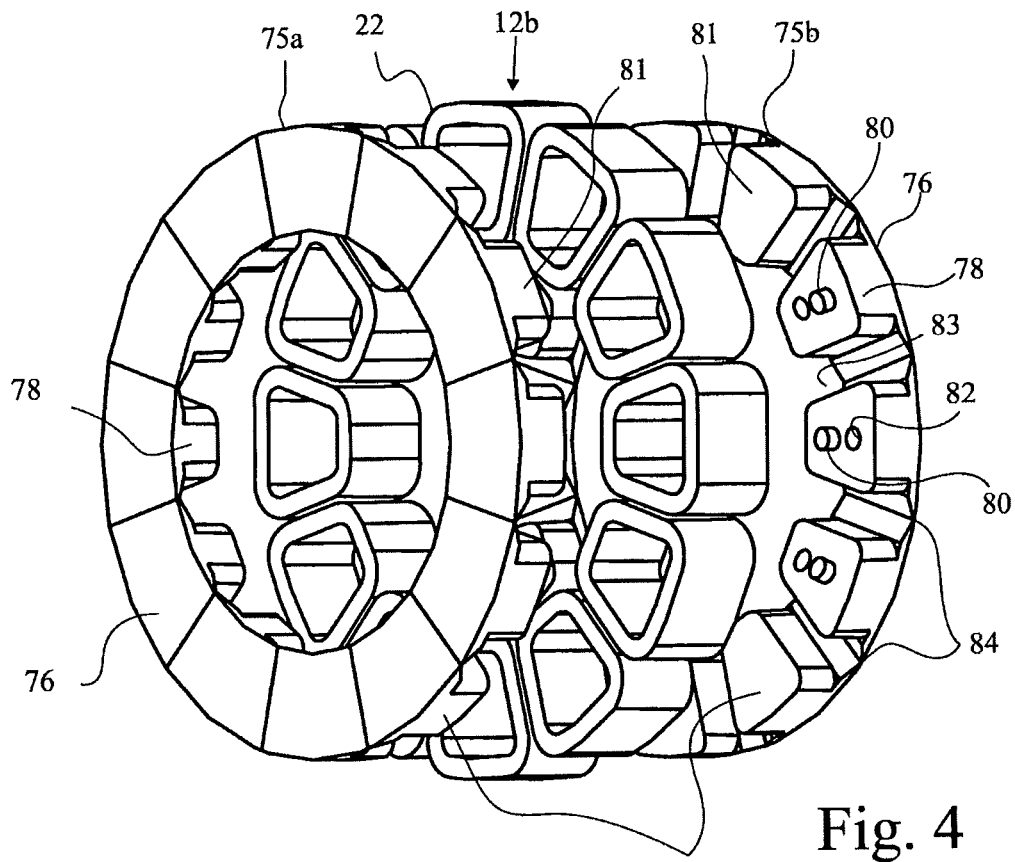
Fig. 4
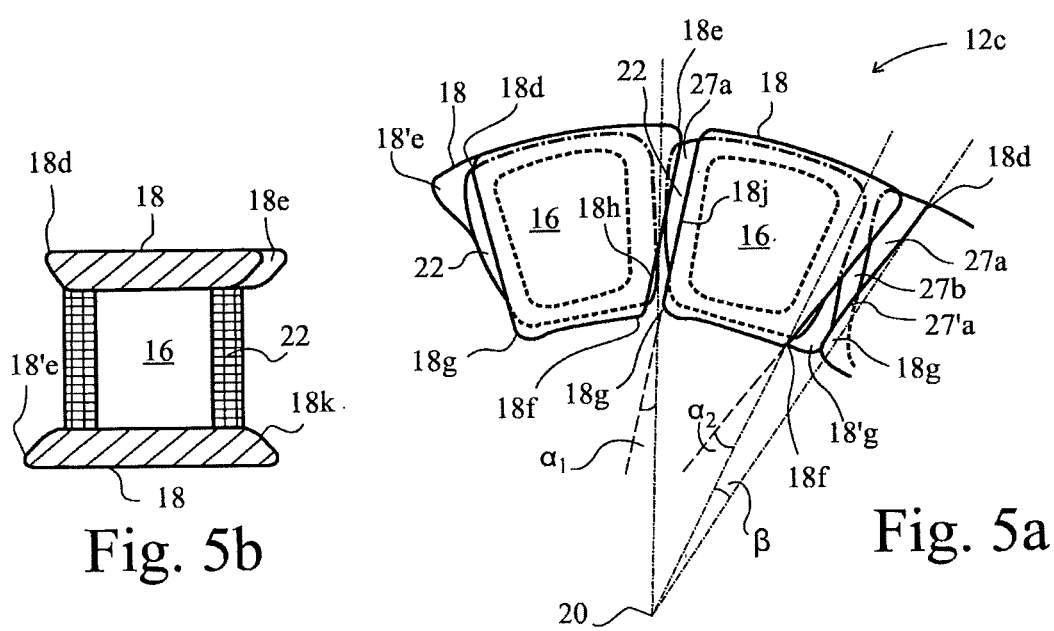
Fig. 5b
Fig. 5a

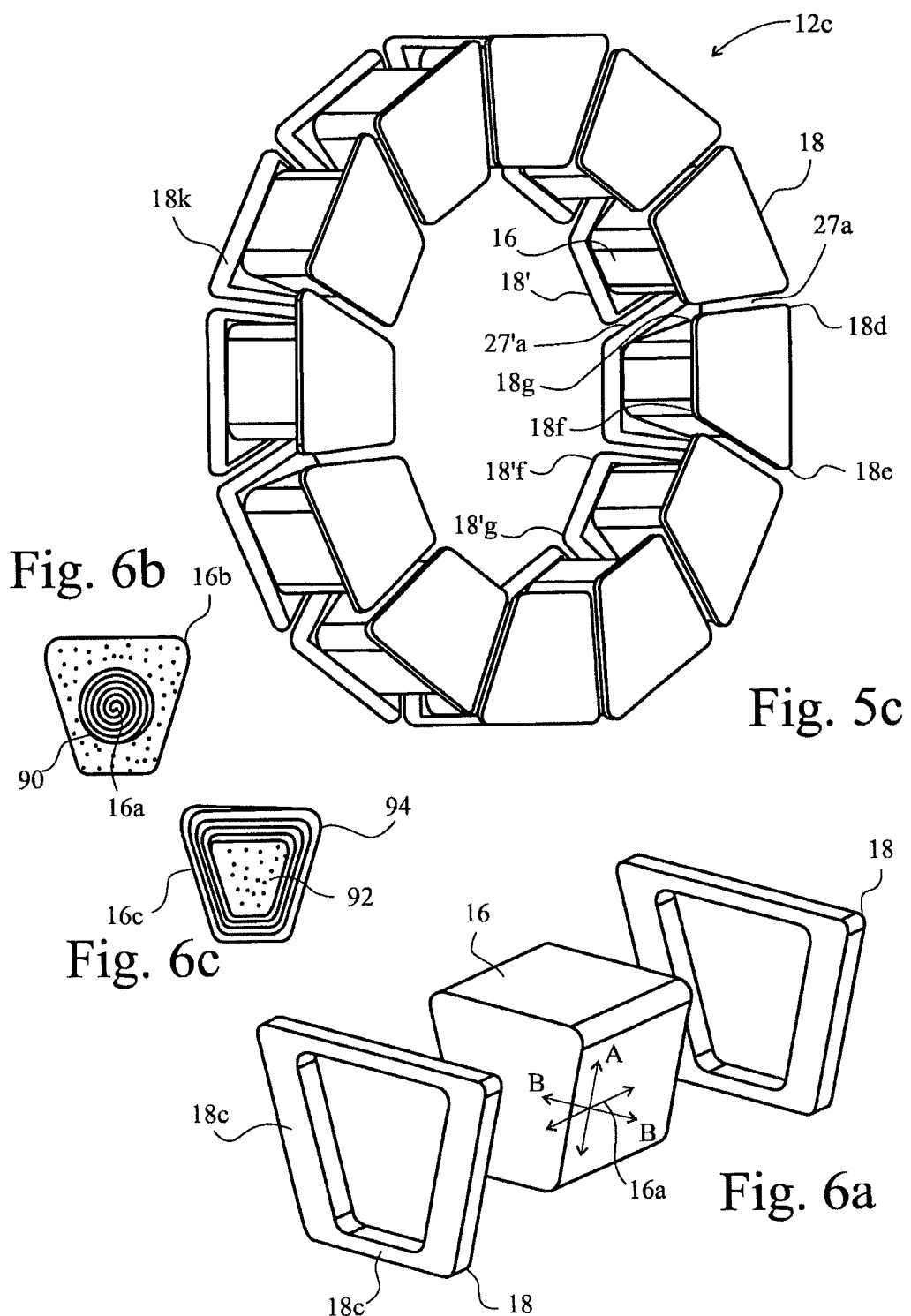

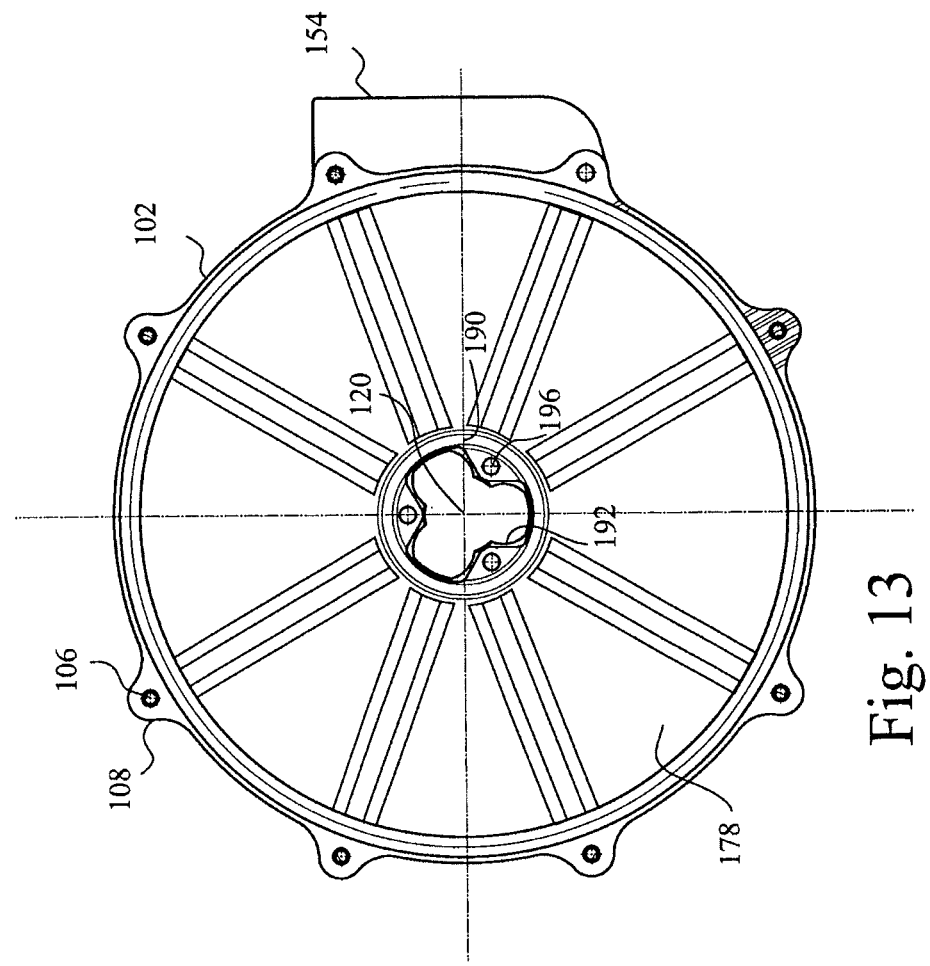
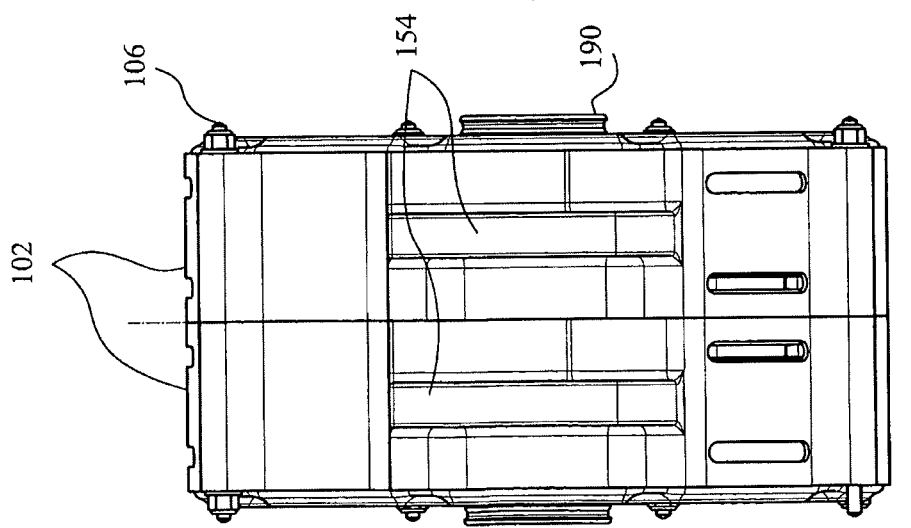

ELECTRIC MACHINE-MODULAR

CROSS REFERENCE TO RELATED APPLICATIONS

This application is a 35 USC 371 national phase of International Application No. PCT/GB2010/050236 filed Feb. 12, 2010, which claims priority to U.K. Patent Application No. 0902393.8 filed Feb. 13, 2009, the contents of all of which are hereby incorporated herein by reference in their entirety.

This invention relates to a permanent magnet electric machine comprising a stator and a rotor journalled for rotation in the stator. The stator is provided with coils wound on and the rotor is provided with permanent magnets to cooperate with the coils across an air gap between the rotor and stator. The machine may be either a motor or a generator and is in many embodiments an axial flux machine. In particular it relates to a yokeless and segmented armature machine (hereinafter referred to as a Y machine).

BACKGROUND

Woolmer and McCulloch [1] describe the topology of a Y machine, discussing its advantages of reduced iron in the stator enabling an improvement in torque density. It comprises a series of coils wound around bars spaced circumferentially around the stator, ideally axially disposed, (ie parallel the rotation axis of the rotor). The rotor has two stages comprising discs provided with permanent magnets that face either end of each coil of the stator. The magnetic path at any stage of operation is: through a first coil into a first magnet on a first stage of the rotor; across a back iron of the rotor to an adjacent second magnet on the first stage; through a second coil of the stator adjacent the first coil; into a first magnet on the second stage of the rotor aligned with the second magnet on the first stage; across the back iron of the second stage to a second magnet on the second stage and aligned with the first magnet on the first stage; and completing the circuit through the first coil.

One difficulty with electric machines generally is to provide adequate cooling. This is a particular problem with a Y machine having a high torque density that significant heat is generated in the coils at high torques and is often a limiting factor in the torques that can be employed, at least for extended periods of time.

Another difficulty with electric machines generally is torque ripple caused by cogging. Again, this is a particular problem with a Y machine since the discrete coils do not overlap and indeed rely on magnetic separation, not only between adjacent coils on the stator but also between adjacent magnets on the rotor. Clearly, this problem is reduced to some extent by providing different numbers of permanent magnets on the rotor versus coils on the stator, but since magnets are aligned with one another as the "cog" between adjacent magnets engages with the corresponding "cog" between adjacent coils there is an inevitable torque ripple.

Magnetic connection between the coils and the permanent magnets depends on a strong magnetic field being developed through the coils, either by the magnets in the case of a generator or by the coils themselves in the case of a motor and the permeability of the magnetic circuit should be as low as possible to permit the maximum flux density through the coils. For this purpose a high permeability core or bar is provided around which the coils are wound. However, the bar is preferably laminated or otherwise arranged to reduce the incidence of eddy currents in the bar. Also, the bars are preferably provided with shoes to spread the flux in the air gap and reduce the flux density therein—the air gap is of high reluctance and increasing its area reduces that reluctance, which means that less permanent magnet material can be used. It is desirable to reduce the amount of such material to a minimum.

WO-A-2006/066740 discloses a Y machine comprising a housing having a cylindrical sleeve mounting stator coils internally, the sleeve being hollow whereby cooling medium is circulated. However, the coils are embedded in a thermally conducting material to carry heat to stator housing. A rotor is rotatably journalled in the housing. The stator bars appear to be laminated, as they are in GB-A-2379093 that also discloses a Y machine, as does WO-A-03/094327.

U.S. Pat. No. 6,720,688 discloses a Y machine in which the rotor acts as a vane pump to circulate fluid within a chamber defined by a stator housing through which a rotor shaft, supported on bearings in the housing and carrying the rotor, extends. The fluid cools stator coils. US-A-2005/0035676 discloses another Y machine, particularly adapted for gearless drive of a vehicle wheel.

US-A-2007/0046124 discloses a Y machine in which the rotor has two circumferentially arrayed rows of alternating segments of permanent magnets and ferromagnetic pole pieces.

BRIEF SUMMARY OF THE DISCLOSURE

In accordance with the present invention, there is provided a shaftless electric machine comprising a stator and a rotor mounted for rotation about a rotor axis with respect to the stator, permanent magnets being carried by the rotor, an output on the rotor, the stator comprising coils wound on stator bars for interaction with the magnets of the rotor, the rotor having two stages arranged one at either end of the stator bars, with two air gaps between the ends of the bars and the rotor stages, an annular housing retaining and mounting the stator; a bearing between the rotor and stator, the rotor being hollow around said rotor axis, said output comprising a flange connectable to the rotor for transmitting. The rotor is thus not otherwise supported in or on the housing. Being shaftless means that any component to be rotatably driven by (or provide rotary drive to) the machine can be connected to the flange. This component may comprise a shaft, but preferably it comprises a component that can be arranged within the confines of the rotor to save space. Alternatively, it may comprise a universal joint housing or spider housing for providing angularly variable drive to for from a shaft. It may comprise the flange of another machine for doubling up the output power available.

In one exemplary embodiment, there are at least two significant magnetic flux paths of the motor: a first passing through a first stator bar, across a first of the air gaps, through a first magnet on a first stage of the rotor into a back iron of the first stage, into an adjacent second magnet, across the first air gap into a second stator bar adjacent the first, across the second air gap, through a third magnet on second stage of the rotor into a back iron of the second stage, into an adjacent fourth magnet, across the second air gap and back into the first stator bar; and a second path passing through the first stator bar, across the first air gap and through the first magnet on the first stage and into the back iron of the first stage, through the first stage into the second stage of the rotor around said bearing into the back iron of the second stage, into the fourth magnet, across the second air gap and back into the first stator bar.

This flux path is possible if the rotor is directly mounted through said bearing inside the stator, and on a sufficiently large diameter that the second flux path is sufficiently short so that the reluctance of the overall magnetic circuit for the coils and magnets is reduced. Mounting the rotor in this way also shortens the cantilever between the bearing that locates the rotor and the magnets that drive the rotor through their interaction with the stator coils (or are reacted by the stator coils in the case of a generator).

However, in another embodiment:

the stator coils are spaced around the rotor axis and said rotor stages approach the rotor axis no closer than a first, stator radius ($R_1$) of the stator; and the bearing comprises rolling elements rolling on a surface of the rotor that is no closer to the rotor axis than a second, rotor radius (r), which rotor radius is between 60% and 90% of the stator radius.

With such a large diameter of the rotor bearing, and a hollow rotor, several advantages flow, starting from the ability of the rotor to be relatively stiff whereby the air gaps can be small without risk of contact. Alternatively, the mass of the rotor can be reduced leading to efficiency and cost savings Preferably, the surface of the rotor on which the rolling elements roll is an integral surface of the rotor flange. Said integral surface of the rotor flange is preferably hardened and may be frusto-conical, said rolling elements then being needles. The rotor radius is in this event the minimum separation of the needles from said rotor axis.

The stator coils may have a radial extent ($C_1$) such that the smallest circle enclosing the stator coils has a coil radius ($R_2$) where the stator radius ($R_1$) is between 50% and 80% of the coil radius ($R_2$). The coils may have a circumferential extent ($C_2$) that is between 50% and 150% of the radial extent ($C_1 = R_2 - R_1$).

Preferably, the entire load between the output and the annular housing is transmitted through the bearing between the stator and rotor, whereby no other mounting of the rotor or its output with respect to the stator housing is provided. This has the advantage that the form of output can be changed from system to system without disturbing the fundamental arrangement of the rotor, stator and stator housing. While the term "output" used herein is appropriate for a motor, where the output is employed to drive a load, it is inappropriate for a generator and should in that context be understood as an input.

Preferably, the bars are axially aligned with the rotation axis of the rotor, the bearing being between two radial planes that intersect said air gaps. Preferably, said intersects are radial.

Preferably, the bearing is between two radial planes that intersect the coils, bars or shoes of the stator.

Preferably, the bars and coils thereon are enclosed by a stator housing that extends between the air gaps and defines a chamber incorporating cooling medium to cool the coils.

Said stator housing may comprise two annular plates and two cylindrical walls, the annular plates including recesses to locate the bars within the chamber. Preferably, the material of the stator housing is non-magnetic and non-conducting. However, in the case of the separate annular plates and cylindrical walls, said cylindrical walls are preferably aluminium and said annular plates are plastics material. Preferably, said annular plates are thinned at the ends of the bar to minimize the gap between the bars and the magnets on the rotor. Preferably, said cylindrical walls are an inner and outer wall, said outer wall having means to mount the machine and said inner wall mounting said bearing.

Preferably, the rotor stages each comprise an annular dish, whose outer rims mount said permanent magnets and whose inner rims are connected together enclosing said bearings.

The rotor stages are dish-shaped to increase their rigidity in a radial plane (ie a plane perpendicular to the rotation axis of the rotor and also, preferably, perpendicular to the stator bars).

Preferably, the bars and coils thereon are enclosed by a stator housing that extends between the air gaps and defines a chamber incorporating cooling medium to cool the coils. The stator housing may include ports for supply and drainage of said cooling medium. Preferably, the stator housing comprises two annular plates and two cylindrical walls, the annular plates including recesses to locate the bars within the chamber.

The material of the stator housing may be non-magnetic and electrically non-conducting. Indeed, it may be heat insulating, in which case the stator housing preferably insulates the magnets from heat generated in said coils.

However, the stator housing is preferably thinned at the ends of the bar to minimize the gap between the bars and the magnets on the rotor.

Said cylindrical walls may be aluminium and said annular plates are plastics material. They may be an inner and outer wall, said outer wall comprising said annular housing and having means to mount the machine and said inner wall mounting said bearing.

Preferably, said stator housing includes ports for supply and drainage of said cooling medium. The cooling fluid may be pumped through the machine through an inlet near the bottom of the machine, and out of an outlet near the top. However, the inlet and outlet may also be adjacent one another. Fluid may flow around the outer and inner radii of the coils, some fluid also flowing between the coils. Preferably, the cooling fluid flows back and forth between the outer and inner radius on plural occasions by reason of blocks disposed between the coils and the stator housings, whereby the fluid is forced in between the coils. There may be between two and eight transitions of the fluid flow between the coils. The cooling flow may alternatively be split, with some flowing around the inner diameter of the coils from the inlet, and the rest flowing at the outer diameter in the opposite direction, some fluid flowing also between the coils. Different flow paths may of course be arranged.

Preferably, the rotor stages each comprise an annular dish, whose outer rims mount said permanent magnets and whose inner rims are connected together enclosing said bearing. Each said inner rim may comprise a cylindrical flange with an interface for mutual inter-engagement. A spacer may be provided between the cylindrical flanges to adjust preload on the bearing.

The cylindrical flanges can include bosses arranged parallel said rotor axis to receive fasteners for clamping said rotor stages together.

The output of the machine may comprise a disc and a hub. The hub may include any convenient drive form such as a constant velocity hub, or merely a splined shaft. For some ap[placations a tripod cup may be provided. Conveniently, the disc is connectable by said fasteners to said bosses of the rotor. Preferably, the bearing comprises two bearings, one on either side of a flange on the stator, whereby axial location of the rotor stages with respect to the stator is determined.

Said annular housings may have axial interfaces enabling at least two such machines to be connected together, sharing a common rotor axis. The rotors of the connected machines may themselves be interconnected by fasteners passing through the bosses of adjacent rotors, a spacer being disposed between them. This enables greater torque capacity machines to be provided.

The exposed ends of the machine are preferably closed by covers fitted on the annular housing, at least one having a central aperture through which said output is adapted to extend.

Where the machine is a motor preferably at least two of the motors are connected side by side, at least two of which have independent rotors, each provided with its own output. In this event, each cover is provided with said central aperture through which the two outputs extend. Indeed, an aspect of the present invention provides a vehicle comprising a motor defined above, having a driveshaft from each output to wheels on different sides of the vehicle. In this case, provided the rotors are independent, no differential is required.

In another embodiment there is provided an electric machine comprising a rotor having permanent magnets and a stator having coils wound on stator bars for interaction with the magnets across an air gap defined between them, wherein the rotor has two stages arranged one at either end of the bars and wherein the bars have a shoe at each end of each bar that links magnetic flux through the bars with said magnets on each stage, and wherein adjacent shoes facing the same stage of the rotor have a high-reluctance shoe gap between them, and adjacent magnets on each stage of the rotor have a high-reluctance magnet gap between them, wherein the shoe and magnet gaps are angled with respect to each other such that they engage progressively as the rotor rotates.

Preferably, the shoe on one side of each coil facing a first of said two stages is skewed with respect to the shoe on the other side of the respective coil facing the second of said two stages, and said shoe gaps between adjacent shoes at either ends of the bars that carry them cross the magnet gap at different rotational positions of the rotor with respect to the stator.

Thus, although the coil on a given bar and the magnet pair on the rotor stages are aligned, the coil at one end begins to engage the first magnet of the pair before the other magnet. Preferably, the skew is such that there is no alignment in the direction of magnetic flux of the high-reluctance gaps at each end of each bar.

Preferably, when viewed in an axial direction with respect to the axis of rotation of the rotor, said shoes are four-sided, with inner and outer sides being arcs or tangents of circles centred on said rotation axis and said other sides being a leading and trailing edge of the shoe, wherein said leading and trailing edges are chords of one of said circles, each radius of that circle that intersects each chord and that circle making the same angle with the respective chord.

In yet another embodiment there is provided an axial flux electric machine comprising a rotor having permanent magnets spaced circumferentially on first and second stages of the rotor and a stator disposed between said stages and having coils wound on stator bars of the stator for magnetic interaction with the magnets across an air gap defined between the rotor and stator, wherein the bars have a shoe at each end of each bar that links magnetic flux through the bars with said magnets on each stage, and wherein the stator is a casting of at least two annular components, each comprising a ring of connected shoes and one including some or all the bars or parts of them and the other comprising any remaining bars or parts of them, said coils being disposed on the bars before the annular components are connected together to complete construction of said stator.

Preferably, the annular components are identical. Preferably, each comprises half of each bar and is provided with interfaces adapted to facilitate connection.

Preferably, said interface comprises a stud and socket, wherein the stud on each bar of one component engages the socket of a facing bar on the other component.

Preferably, high reluctance gaps are provided between each shoe of each component, said gap comprising a thinning of the thickness of the annular component between said bars.

In a still further embodiment there is provided an electric machine comprising a rotor having permanent magnets and a stator having coils wound on stator bars for interaction with the magnets across an air gap defined between them, wherein the bars have shoes that link magnetic flux through the bars with said magnets, and wherein the bars and shoes are formed separately from one another and at least a part of each is formed by moulding soft-iron particles so that the particles have a short dimension that is arranged transverse a reluctance-plane, and the bars and shoes are assembled so that said reluctance-plane of the bar is parallel a longitudinal axis of the bar and said reluctance-plane of the shoe is transverse said longitudinal axis.

The alignment of the short dimension of the particles transverse said reluctance-planes results in each reluctance-plane having a minimum reluctance. Preferably, said particles of at least the bars have a single longitudinal dimension and said particles are also aligned so that their longitudinal dimension is parallel a reluctance-direction in said reluctance-plane, said reluctance-direction of the bars being parallel said longitudinal axis of the bar. If the particles of the shoes have a single longitudinal dimension, preferably said reluctance-direction is radial with respect to said longitudinal axis when the bars and shoes are assembled.

Said moulding of said soft-iron particles may be by pressing round soft iron particles in a direction transverse to said reluctance-plane whereby the particles are flattened to produce said short dimension. Alternatively, said moulding may be of already flattened particles, or of elongate particles. Elongate particles may be aligned prior to moulding by use of a magnetic field. Moulding includes shaping.

Preferably, the rotor has two stages arranged one at either end of the bars and shoes are provided at each end of each bar. Preferably, the electric machine is an axial flux machine and the bars are arranged parallel the rotor rotation axis.

The bars may include a rolled sheet of ferromagnetic material whose axis of roll is arranged parallel said longitudinal axis. The sheet itself is preferably rolled in production in a direction parallel their roll in the bars whereby the grains of the material are themselves oriented in the eventual direction of flux, ie parallel said longitudinal axis. Said roll may be disposed around a shaped soft-iron pressed-particle core, whereby the cross section of the bar perpendicular said longitudinal axis is substantially trapezoidal. Alternatively, said roll may be the core of a shaped annulus of pressed soft-iron particles, whereby the cross section of the bar perpendicular said longitudinal axis is substantially trapezoidal.

In accordance with other aspects of the present invention, there is provided electric machines that incorporate some or all of the foregoing aspects (where they are not mutually exclusive), such combinations being evident to the skilled person. Whereas the following description of specific embodiments may include or exclude different aspects mentioned above, this is not to be understood as being significant.

BRIEF DESCRIPTION OF THE DRAWINGS

Embodiments of the invention are further described hereinafter with reference to the accompanying drawings, in which:

FIG. 1 is a schematic side view of a yokeless and segmented armature machine to which the present invention primarily (but not exclusively) relates;

FIG. 2 is a perspective view of the arrangements of FIG. 1;

FIG. 3 is a perspective exploded view of a stator housing and stator of an electric machine;

FIG. 4 is a perspective exploded view of a stator of an electric machine;

FIGS. 5a, b and c are respectively an end view, a section on the line B-B in FIG. 5a and a perspective view of a stator of an electric machine;

FIGS. 12 and 13 are respectively a side and an end view in the direction of the Arrows XII and XIII respectively in FIG. 9.

DETAILED DESCRIPTION

Figure 6D:
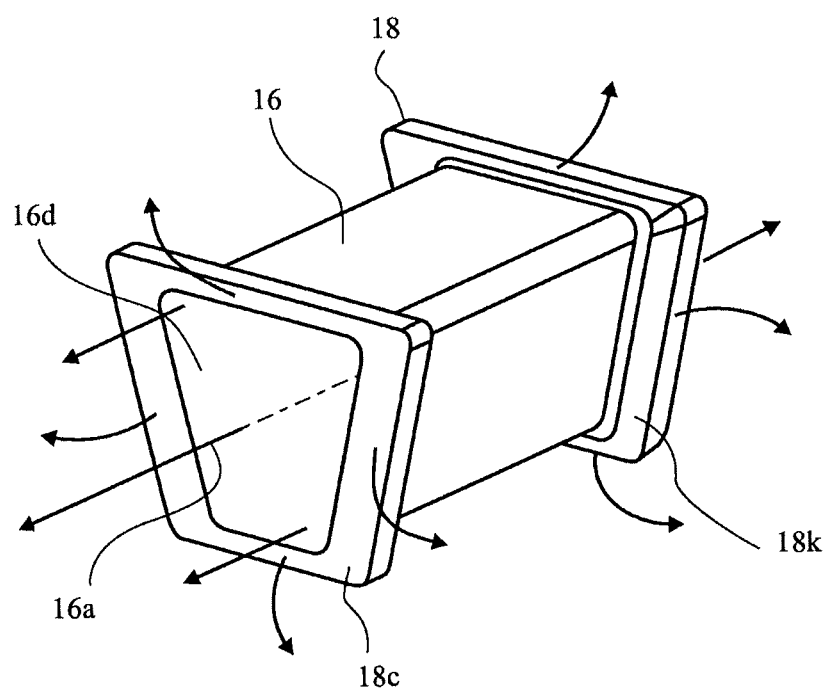
FIGS. 6a, b c and d are respectively an exploded perspective view of a stator bar and shoes of an embodiment of an electric machine, an end view of another embodiment of bar, an end view of a further embodiment of bar, both of an embodiment of an electric machine, and a perspective view of a composite stator bar and resultant flux paths.
Figure 7:
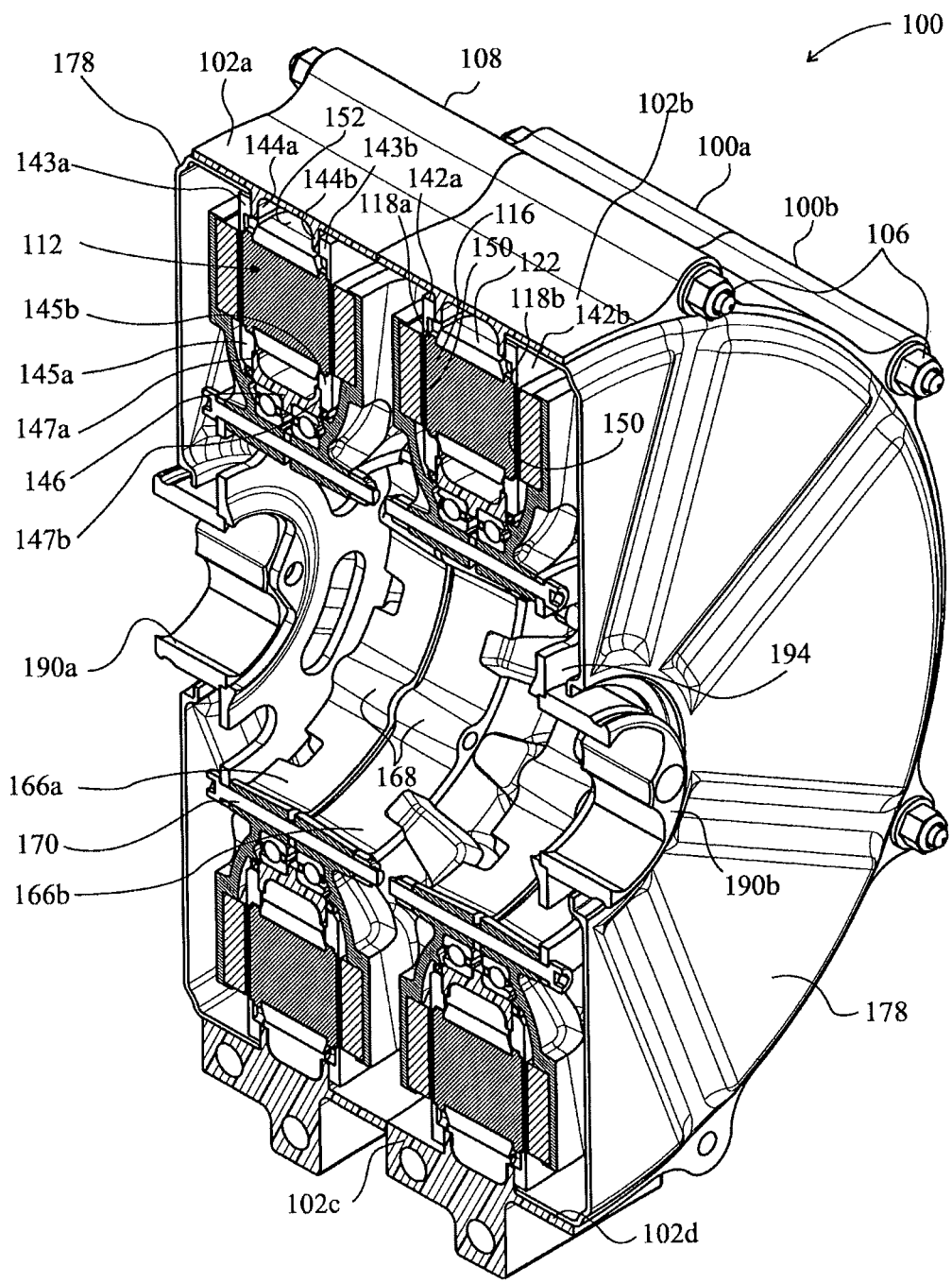
FIGS. 7, 8 and 9 are respectively a cut perspective view, a slice and a section (both of the latter views being in the cut plane of FIG. 7) of an electric machine in accordance with an aspect of the present invention.

A yokeless and segmented armature machine 10 is illustrated schematically in FIG. 1. The machine 10 comprises a stator 12 and two rotors 14a,b. The stator 12 is a collection of separate stator bars 16 spaced circumferentially about a rotation axis 20 of the rotors 14a,b. Each bar 16 has its own axis 16a which is disposed parallel to the rotation axis 20. However, that is not absolutely essential. In an axial flux machine, the axis 16a is indeed parallel the rotation axis 20. However, it can be disposed at any angle thereto, even radially with respect to the rotation axis 20. The following discussion is in respect of an axial flux machine, but this should not be understood to be limiting in any sense and, where the context permits, the invention equally applies to other inclinations of the stator bars 16.

Each end of each stator bar is provided with a shoe 18a,b which serves a physical purpose of confining a coil stack 22, which stack 22 is preferably of square section insulated wire (or possibly rectangular section) so that a high fill factor can be achieved. The coils 22 are connected to an electrical circuit (not shown) that (in the case of a motor) energizes the coils so that the poles of the resultant magnetic fields generated by the current flowing in the coils is opposite in adjacent stator coils 22.

The two rotors 14a,b carry permanent magnets 24a,b that face one another with the stator coil 22 between. Indeed, in the axial flux machine, the rotors and their magnets are radially disposed, but when the stator bars are inclined, then they are likewise. Two air gaps 26a,b are disposed between respective shoe and magnet pairs 18a/24a, 18b/24b. There are an even number of coils and magnets spaced around the axis of rotation 20 and, preferably, there are a different number of coils and magnets so that each coil does not come into registration with a corresponding magnet pair all at the same time and at the same rotational position of the rotor with respect to the stator. This serves to reduce cogging.

In a motor (with which the present invention is primarily concerned) the above-mentioned electric circuit is arranged to energize the coils 22 so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12, which is generally fixed (for example in a housing, not shown). One advantage provided by the arrangement is illustrated in FIG. 1 in that the magnetic circuit 30 is provided by two adjacent stator bars 16 and two magnet pairs 24a,b. Thus, no yolk is required for the stator 12, although a back iron 32a,b is required for each rotor linking the flux between the back of each magnet 24a,b facing away from the respective coils 22.

Thus, in the case of a motor, by appropriate energization of the coils 22, the rotor 14 can be urged to rotate about the axis 20. Of course, in the situation of a generator, rotation of the rotor 14a,b induces currents in the stator coils 12 according to the changing magnetic flux induced in the stator bars 16 as the rotors 14a,b rotate.

However, in either case heat is generated in the coils 22 and the efficiency of the machine is reduced, and its capacity limited, if this heat is not removed. Accordingly, the present invention suggests enclosing the stator coils 16 within a housing that extends through the air gap 26a,b and which is supplied with a cooling medium.

Turning to FIG. 3, a stator 12a in an embodiment is shown in which the stator coils are located between plastics material clam shells 42a,b. These clamshells have external cylindrical walls 44, internal cylindrical walls 46, and annular radially disposed walls 48. The annular walls 48 include internal pockets 50 to receive the shoes 18a,b of the stator bars 16 and serve to locate the stator coil assemblies 16, 22, 18a,b when the two clam shell housings 42a,b of the stator 12a are assembled together. The stator housing 42a,b defines spaces 52 internally of the coils 22 and also externally at 54 around the outside of the coils 22. Furthermore, there are spaces 56 between the coils. Although not shown in FIG. 3, when assembled, the stator housing 42a,b is provided with ports that allow cooling medium (preferably electrically non-conducting liquid) to be pumped into the spaces 52, 54, 56 to circulate around the coils and cool them. Indeed, being made, preferably, from a plastics material such as [polycarbonate] or other low heat-conducting material, heat generated by the coils and conducted into the shoes 18a,b is retained within the housing and not transmitted to the magnets 24a,b, which are particularly susceptible to heat. Choice of the material employed for the clamshells 42a,b is to some extent dependent on the design working temperature and, if this is low, many materials are suitable, but, if it is high, then heat resistant material such as glass fiber reinforced plastics material would be desirable. Further reference to the cooling arrangements of the present invention are also described below with reference to FIGS. 7 to 13.

A preferred arrangement involves construction of the machine as described above and then, when complete, filling the spaces 52,54,56 with a settable liquid resin or lacquer that wets all the internal surfaces of those spaces, including the coils 22. Once the resin has had the opportunity to penetrate every space it is drained from the machine leaving only a surface coating of the resin inside the chamber defined by the spaces 52,54,56. Prior to draining, the chamber may be evacuated in order to commit the liquid lacquer to penetrate small spaces, especially between the wires of the coils 22. When the vacuum is removed, resumption of atmospheric pressure drives the lacquer into any remaining unoccupied spaces. Indeed, the lacquer is preferably of low viscosity so that it penetrates small spaces easily. After draining, the resin cures (or is cured) to form an electrically insulating layer that separates the spaces 52,54,56 from coils 22. By this means, water can be employed as the cooling medium. Suitable lacquers are within the knowledge of a person skilled in the art.

Referring again to FIGS. 1 and 2, even without identical numbers of magnets 24a,b and coils 22, an inherent problem of the arrangement is the cogging effect that occurs as the high-reluctance gaps 25 between adjacent magnets pass over the corresponding gaps 27 between stator coil shoes 18a,b.

It is well known that coil cores for electric machines are frequently made from steel laminations. Steel is an excellent conductor of a magnetic field. It provides a low reluctance path therefore and has low hysteresis loss. However, a problem with most ferromagnetic materials is that they are generally also electrical conductors. Therefore, the changing flux through an electrical conductor creates eddy currents. These are minimized by employing laminations that are separated by an insulator, with the insulation being parallel to the desired flux direction so that transverse electrical currents are minimized. However, a new technique is meeting with some success employing soft-iron particles coated with insulation and moulded to a desired shape (soft magnetic composites—SMC), being bound together by the resinous insulation. A high-pressure compaction process is used to mould the component into a complex shape, capable of producing three-dimensional magnetic flux patterns with an excellent form factor and enabling a high fill factor winding to be employed, wound straight onto SMC teeth.

Turning to FIG. 4, a stator 12b of an embodiment of electric machine is shown. This is a particularly suitable arrangement of the stator in a low cost arrangement. It has integral stator bars 16' formed from two, preferably identical, components 75a,b. Each component is an annulus 76 with upstanding bar-parts 78. The bar-parts may have alternating studs 80 and pockets 82 on facing interfaces 81, so that, when oriented to face one another, two identical components 75a,b can be mated together, with the studs 80 entering the pockets 82 of the other component. The two components can be glued together. However, prior to assembly, pre-wound coils 22 (shown schematically in FIG. 4 as solid rings) are located on the bar parts 78 of one component 75a,b so that, when connected together, the components 75a,b and the coils 22 complete an assembly of the magnetic parts of the stator 12b.

The advantage of the arrangement shown in FIG. 4 is that the magnets facing the annulus 76 on each side of the stator are never presented with an air gap between adjacent stator coils 22. Accordingly, the inherent problem of cogging mentioned above can be eliminated, or at least reduced—the magnets see a continuous reluctance, which can be almost constant as a function of rotor position. However, magnetic connection between adjacent coils is to be discouraged, since that short circuits the flux path and reduces the efficiency of the motor. Accordingly, the annulus 76 is thinned at 84 between each bar part 78 so that the opportunity for magnetic shorting is reduced. However, by providing a high reluctance gap 84 between each stator coil this mitigates the anti-cogging effect of the complete metal face 76. Accordingly, there is a balance to be made between smooth running of the motor and its efficiency. Nevertheless, there is an optimum position at which cogging is minimized to a substantial degree without significant impairment of motor efficiency. An advantage of the present embodiment is its potential low cost of manufacture.

The components 75a,b are advantageously constructed from SMC material, each pressed in a single mould. However, the simplicity of their shape also permits them to be manufactured from a single annulus of wound laminations (having an axis of winding on the rotation axis 20), with slots 83 between adjacent bar parts 78 being cut out with a wire cutter.

Finally, the advantage of the present invention could be achieved by employing the arrangements described above with reference to FIGS. 2 and 3 but where the shoes 18 and bars 16 are not constructed in a single annulus but each independently. In this event, the shoes are sized so that they contact one another when arranged in the motor and thereby reduce cogging.

In FIGS. 5a and b, an alternative arrangement of the stator 12c is shown that also reduces cogging, but without affecting the efficiency of the machine. Here, each stator bar 16 is provided with its own shoe 18 so that there is a resultant air gap 27a between them. Normally, this would result in the cogging effect mentioned above. However, here, the air gap 27a is skewed relative to the radial direction by an angle $\alpha_1$, at least one side 18j of the shoe is skewed at this angle, the radius in question passing through the bottom corner 18g of the shoe. The other side 18h of the shoe is skewed at an angle $\alpha_2$ that differ from $\alpha_1$, by a quantity dependent on the width of the air gap 27a. Be that as it may, the average value of $\alpha_1$ and $\alpha_2$, is between 1° and 45°, conveniently about 10° with the number of pole pieces shown. The stator bar 16 is trapezium shaped, as in the embodiments described above, with rounded corners and the coils 22 are likewise trapezium shaped around the cores formed by the bars 16. They are symmetrically disposed with respect to the rotation axis 20. This means that at opposite corners 18d,f the coil 22 extends beyond the extremity of the shoe 18. However, at least at the outer edge 18e, the shoe overlaps to a small extent the coil 22 of the adjacent shoe. The trailing corner 18g at least overlaps the coil 22 of its own stator bar 16.

To the right of FIG. 5 is shown, in dotted line, the air gap 27'a that is on the opposite side of the stator 12c, the bottom corner 18'g of its shoe being fully visible. It can be seen, therefore, that the two air gaps 27a, 27'a overlap in an axial direction only in a small diamond shaped region 27b. Assuming that the high reluctance gaps 25 between the magnets on the rotors are radial, then the effect of skewing the shoes is that the transition from one magnet to another from the perspective of a particular stator coil is spread over a wider arc of rotation of the rotor with respect to the stator than if the gaps are both radial.

Of course, it is equally feasible to skew the magnet gaps 25 and the same effect can be achieved. That is to say, the shoe gaps 27 could be radial, as they are in the embodiments described above with reference to FIGS. 1 to 3, with the magnet gaps inclined oppositely with respect to each rotor 14a,b. Alternatively, a combination of skews of both the stator shoes and rotor magnets could be arranged. However, shaping the magnet is expensive, whereas the stator shoes are preferably a pressed part that is easily shaped. In any event, it is desirable that the arc of transition, shown as the angle β (being the angle subtended between the circumferential limits of the two shoe gaps 27a, 27'a), is equal to about the sum of $\alpha_1$ and $\alpha_2$. Of course, there is a balance to be struck, because the transition from one magnet to another represents a region a torque reduction and therefore spreading this has the corollary effect of concentrating the torque in between the transitions.

It is also to be noted that the shoes 18 are chamfered outwardly at 18k around the entire periphery of the shoe. This assists in focusing the flux out of the plain of the shoes 18 towards the magnets 24a,b.

Indeed, in an aspect of the present invention, the problem of minimizing the reluctance of the material of the stator bar and shoe in the direction of the magnetic flux is addressed in the arrangement of FIGS. 6a to d. Thus while SMC material is very suitable, as discussed above with reference to FIG. 4, it should be noted that, while coated soft-iron particles have the capacity to reduce eddy currents and generally to have a low magnetic reluctance in all directions, they do not have the best, that is to say, the minimum reluctance possible, which is still in the domain of laminations, at least in the plane or direction of the laminations.

In this aspect, the present invention suggests employing such particles in the construction of the stator bar 16 and shoes 18, but arranging them so that they have a preferential direction, or at least plane, of low reluctance, which is preferably lower than normally provided by such particles. In the case of the bar 16, this preferential direction is in planes parallel to the axis 16*a*. In the case of the shoes 18, a minimum reluctance is desirably arranged in planes perpendicular to the longitudinal axis 16*a*. This can be provided in several ways, although fundamental is the separate construction of the bar 16 and shoes 18, as shown in FIG. 6*a*, and their subsequent assembly.

Thus, the bar 16 of FIG. 6*a* is manufactured from round, insulation-coated, soft-iron particles. These particles are first flattened into disc-like components, before being placed into a mould and finally pressed together. The mould is arranged so that the direction of pressing of the particles, and their initial distribution prior to pressing, is such that the major dimensions of the particles lie in a plane that is parallel to the axis 16*a*. This might most conveniently be achieved, albeit only partially, by commencing with essentially round particles in the mould and pressing them together in a direction perpendicular to the axis 16*a*. For example, pressing upwardly in the direction of the Arrow A not only flattens the particles in a plane orthogonal to the direction A, but also tends to spread them in the direction of the Arrows B.

Ideally, however, the particles are elongate and are arranged in the mould with their long axis parallel to the axis 16*a*. This can be achieved by employing a magnetic field to align the particles. In that event, the line of minimum flux for the component is not just in planes parallel to the axis 16*a*, but actually in that specific direction.

On the other hand, the shoes 18 are preferably manufactured by pressing round particles in a direction parallel to the axis 16*a* so that, during the compaction process, they spread laterally in the plane perpendicular to the axis 16*a*. When the shoes 18 and bar 16 are assembled together, the magnetic flux can therefore travel with minimum reluctance through the bar 16 in the direction of the longitudinal axis 16*a* and exit the bars 16 both in the direction of the axis 16 from the end 16*d* of the bars to enter directly the air gaps 26*a,b*, but also orthogonally into the shoe peripheries 18*c*, as can be seen from the magnetic flux arrows indicated in FIG. 6*d*.

In a preferred arrangement, the stator bars 16 also comprise a lamination roll, which can improve the directional bias of minimum reluctance. Thus, in FIG. 6*b*, a roll 90 of insulation-coated steel is arranged in a mould (not shown) with its axis parallel the (ultimate) axis 16*a* of the bar 16*b* to be formed. The mould is then filled with particles that are pressed and compacted around the lamination roll so that a plane of minimum reluctance of the particles is parallel the axis 16*a*. They surround the roll 90 and give the bar its desired trapezium-shaped section.

An alternative construction is to form a trapezium-shaped core 92 of pressed soft-iron particles having at least a plane of minimum reluctance parallel the axis 16*a*. A lamination roll 94 is then wound around the core 92 and results in a stator bar 16*c* having the desired external sectional shape.

Both the bars 16*b,c* of FIGS. 6*b* and *c* each have preferential directions of minimum reluctance parallel to the axis 16*a*. Collars 18*c*, formed from pressed, soft iron particles, have minimum reluctance planes perpendicular to the axis 16*a*. When assembled, the bar and collars result in a stator core that has an extremely low-reluctance and is directionally optimized.

The invention is further described with reference to FIGS. 7 to 13 illustrating a particular construction of motor 100. Again, while a motor is described, it should be understood that the principles also apply directly to a generator. The motor 100 is, in fact, two motor slices 100*a,b* bolted together. Each motor slice 100*a,b* has a tubular housing 102*a,b* having radially planar end faces 104*a,b* whereby several housings 102 can be bolted together end to end by bolts and nuts 106 passing through bosses 108 arranged around the housings 102*a,b*. Indeed, the motor 100 can be mounted in a vehicle, for instance, using the bosses 108 as mounting flanges. Despite being bolted together and being a composite motor 100, each motor slice 100*a,b* is independent of one another, as described further below, and can be driven at its own speed and torque, as required by a motor management system, which is not described further herein. However, as also explained further below, the motor slices 102*a,b* could be connected to a single output drive, thereby doubling the output torque available. Indeed, there is no limit to the number of motor slices that can be stacked together.

Figure 10:
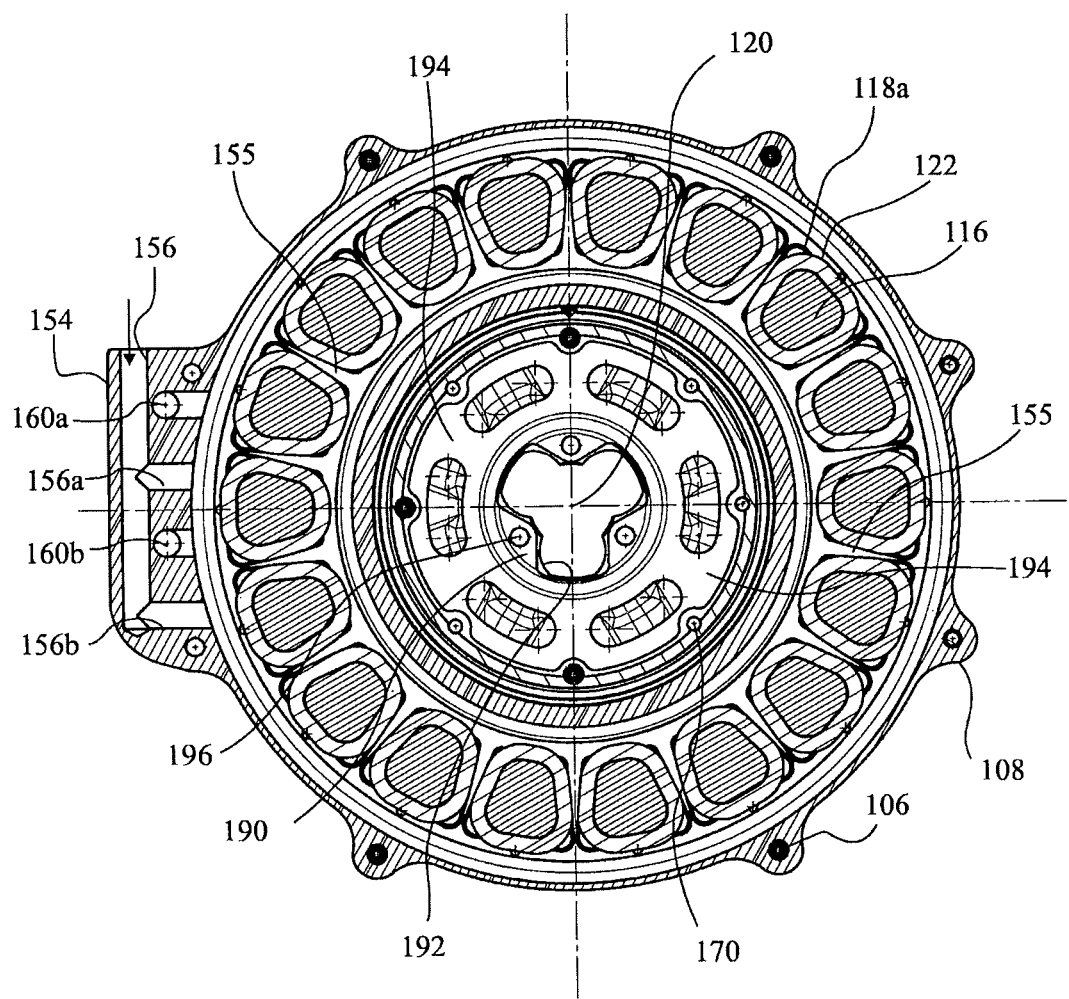
FIGS. 10 and 11a are respectively a section and a slice on the lines 10-10 and 11-11 respectively in FIG. 9.

Thus, each motor slice 100*a,b* has a stator 112 having a plurality of stator coils 122 mounted on stator bars 116 having shoes 118*a,b*. The coils 122 are spaced circumferentially around the rotor axis 120, as shown in FIG. 10 and there are 18 of them in the motor of FIG. 10. Each stator coil shoe 118*a,b* is received in a pocket 150 of an annular non-electrically conducting, non-magnetic clamshell 142*a,b*. The clamshells are fixed around their outer periphery 143*a,b* to internal flanges 144*a,b* of the motor housings 102*a,b*.

The internal edges 145*a,b* of the annular clam shells 142*a,b* are mounted on flanges 147*a,b* of an essentially tubular inner stator housing 146. It is to be noted that the inner stator housing component 146, together with the clamshells 142*a,b* and the motor housing 102 complete an annular chamber 152 in which the stator coils are disposed.

Figure 11A:
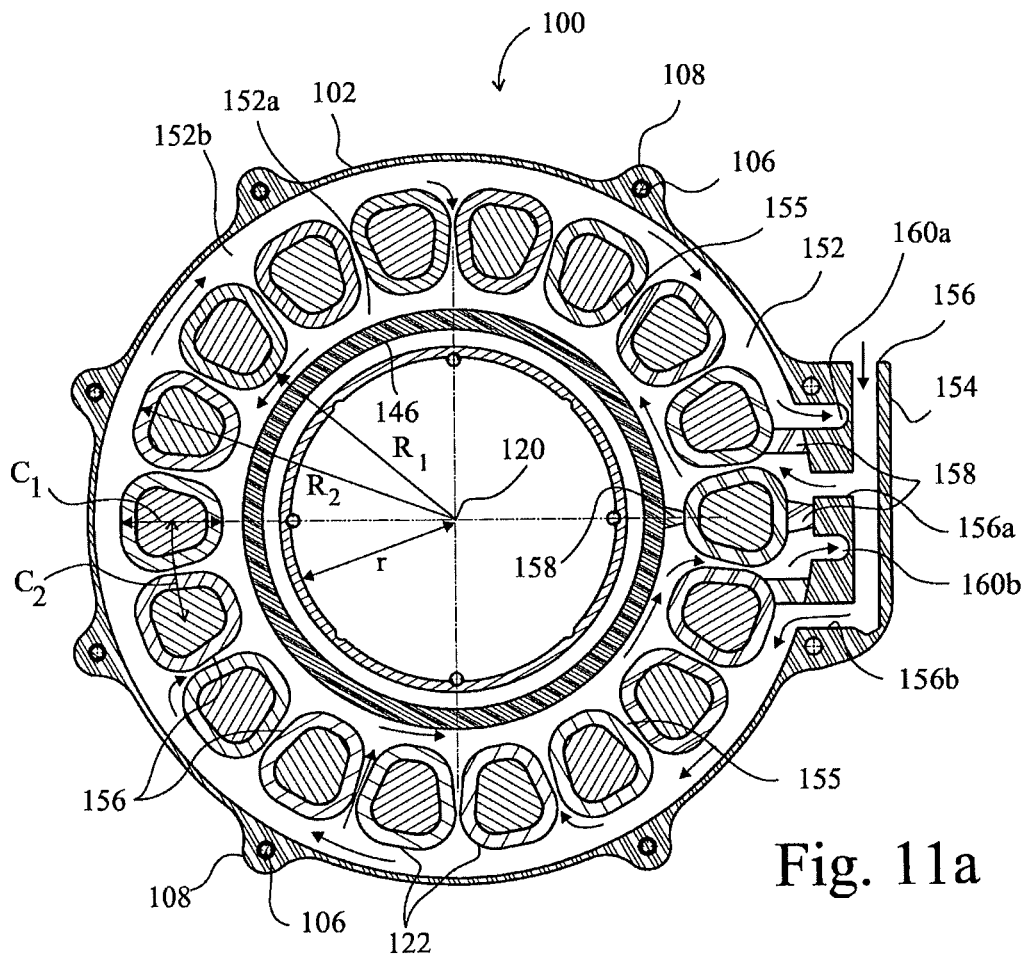
Figure 11B:
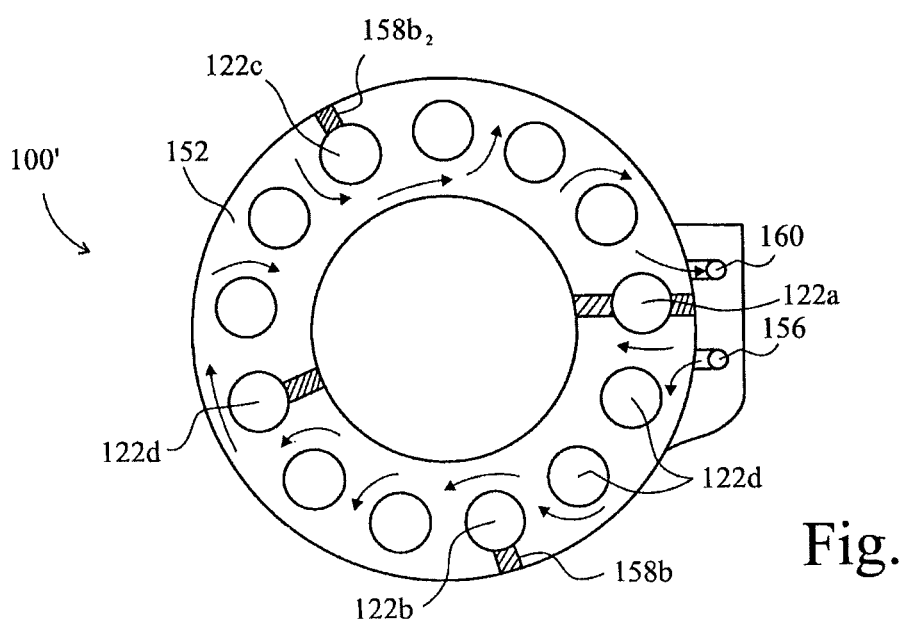
FIG. 11b is a schematic illustration corresponding to FIG. 11a, but with a different coolant flow arrangement.

Turning to FIG. 11, the motor housing 102 is provided with a port boss 154, provided with an inlet 156 for cooling medium. Inside the chamber 152 barriers 158 are disposed between the first coils and the housings 102,146 to divide the chamber 152 into two parallel annular passages 152*a,b*. Each is supplied with their own respective branch 156*a,b* of the inlet port 156. The parallel passages 152*a,b* are separated by the coils 122, between which there are gaps 155. Thus, cooling medium circulating in the passages 152*a,b* can cross and circulate around the entire periphery of the coils 122. After completing a circuit around the motor (in a contra flow direction, it is to be noted, that will encourage turbulence through and between the gaps 155) the cooling medium exits the port boss 154 by outlets 160*a,b*. They join at port 160 (see FIG. 9) and return the cooling medium to a pump and heat exchanger (neither shown) from whence it came. Alternative approaches are quite feasible:

1) The cooling fluid is pumped straight through the machine, with the inlet near the bottom of the machine, and the outlet near the top. The fluid may flow around the outer and inner radii of the coils, some fluid also flowing between the coils. This is the most simple cooling path to implement, but probably the least effective;

2) The cooling fluid is forced to zig-zag around the motor, moving between the outer and inner radius on 2-8 occasions (by blocks disposed between the coils and the stator housings 102,146) so that the fluid is forced in between the coils, which is generally the hottest part of the machine;

3) The cooling flow is split (as described above), with some flowing around the inner diameter of the coils, and the rest flowing at the outer diameter in the opposite direction. Some fluid flow will also occur between the coils; and 4) In a particularly preferred arrangement, the cooling flow is as illustrated in FIG. 11*b* in which one inlet 156' and one outlet 160' is provided, with blocks 158*a* on either side of coil 122*a* between the inlet and outlet. Blocks 158*b* are periodically disposed around the machine firstly (158*b*1) and lastly (158*b*2) on the outside of coils 122*b,c* and between at least one block 158*c* on the inside of coil 122*d*. By this arrangement the flow enters the inlet 156 and begins around the outside of the machine, but is directed by the first block 158*b*1 to transition to the inside of the chamber 152, between different ones of intervening coils 122*d*. From there, flow continues circulation around the machine but is forced by block 158*c* to transition back to the outside of the chamber. Further around the machine, block 158*b*2 obliges transition back to the inside and, finally, in order to exit the machine through outlet 160, blocks 158*a* force transition a final time back to the outside. In FIG. 11*b*, there are four transitions. However, any even number of transitions is possible, or even an odd number if the inlet and outlet are arranged one on the outside of the machine (as shown) and the other on the inside (not shown).

Figure 8:
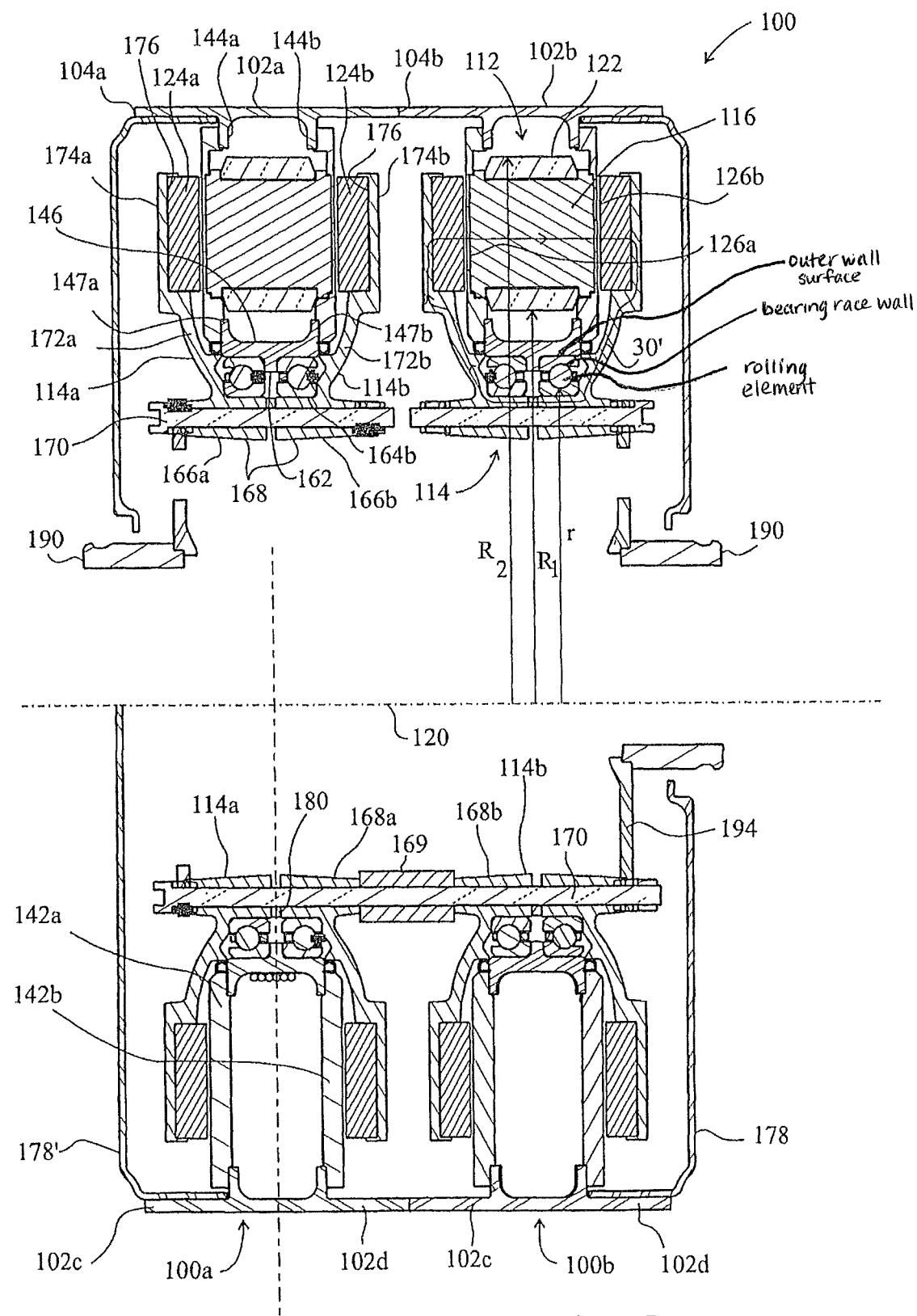
Figure 9:
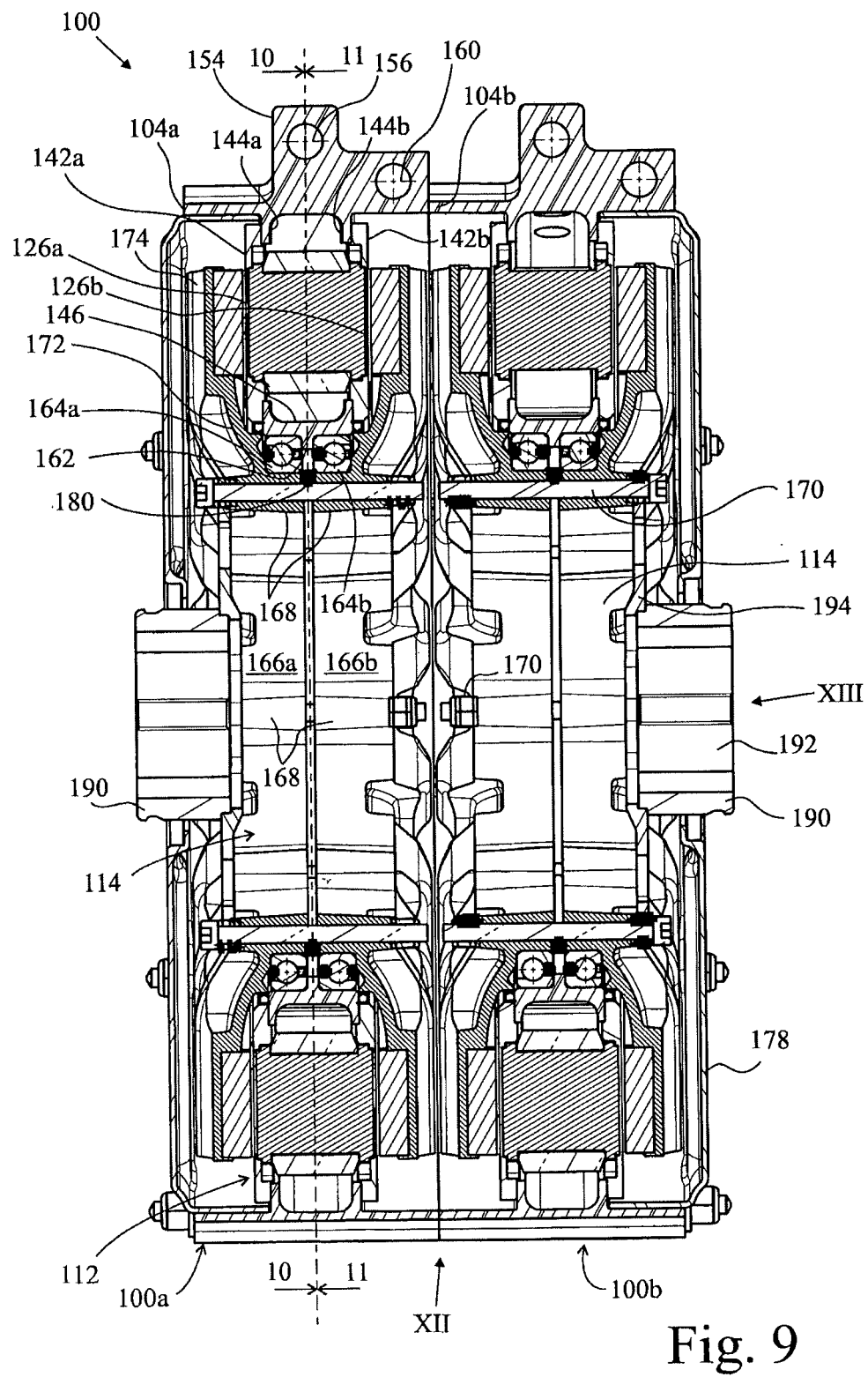

Turning to FIGS. 8 and 9, the inner stator housing 146 has a central internal flange 162 on either side of which are disposed bearings 164*a,b*. The bearings 164*a,b* mount rotors 114*a,b*. The rotors are connected together across internal flanges 166*a,b*. These are tubular and are provided with spaced bosses 168 to receive nuts and bolts 170 that connect the two rotors 114*a,b* together. Thus, the rotors 114*a,b* are, to all intents and purposes, a single, integral structure. Extending from the cylindrical flanges 166*a,b* are dish-shaped wings 172*a,b* that terminate in an annular section 174*a,b* on which magnets 124*a,b* are mounted. Indeed, the extensions 174*a,b* are preferably provided with pockets 176 to receive the magnets and firmly locate them.

Between the magnets 124*a,b* and the clamshells 142*a,b* are air gaps 126*a,b*. As will be well understood in motor technology, the air gaps should be as small as possible in order to reduce the reluctance of the magnetic circuit. However, the arrangement of the motor described with reference to FIGS. 7 to 13 permits a very narrow air gap to be engineered by virtue of the few manufacturing tolerances that have to be accommodated in assembly of the motor 100*a,b*. Because the bearings 164*a,b* represent a significant source of lost motion the rotors are adapted to apply a pre-stress to the bearings, which pre-stress is limited by a spacer 180 disposed between them. Of course, the axial dimension of the spacer can be honed to ensure a tight fit. However, apart from the bearing there are relatively few other components whose tolerances stack up and necessitate a large air gap, Of course, one such component is the stator 112 itself, for which the dimensions of the flanges 147*a,b* of the inner stator housing 146, and the depending flanges 144*a,b*, as well as the dimensions of the clamshells 142*a,b*, are critical in ensuring the smallest possible air gap 126*a,b*, despite the presence of a wall formed by the clamshell being included therein. Moreover, it is apparent that any stresses in the rotor will result in torsional (that is, about axes perpendicular to the rotation axis 120, or in linear stresses in that direction) that must be accommodated by the stator 112. However, the series of stator bars and shoes spanning the chamber 152 provide significant diagonal reinforcement within the chamber 152 to render the inner housing 146 extremely secure in an axial direction.

Furthermore, the concept of mounting the rotor 114 directly in the stator 112 has two further beneficial effects. The first is connected with the general principle of the motor design which demands that the magnets 124 and coils 122 be disposed as far as possible from the rotation axis 120 so that the magnetomotive force acting between the coils and magnets translates into maximum torque about the rotation axis. This means, however, that, if the fixing of the rotor with respect to the stator is at distance that is not much less than the radius of the magnets/coils, the rotor must be very rigid over that distance. By mounting the rotor directly on the stator that distance is reduced and therefore the rotor need not be so rigid. Alternatively, the air gap can be smaller. Secondly, by connecting the rotor using a dish shaped annulus 172 that transforms into a tubular body 166, a further return path 30' (see FIG. 8) for the magnetic flux is created. At least, this is the case if the rotor is made from a ferromagnetic material. This additional flux path is advantageous because it reduces the requirement for the flux to confine itself to a circumferential direction in the flanges 174 between magnets but also permits an alternative return path for each magnet-coil-magnet circuit. The overall reluctance of the magnetic circuit is thereby reduced.

It should be appreciated that the axial force applied to each rotor due to the magnets is significant, and it increases as the air gap reduces and may be of the order of 7500 N per rotor. As a result of this, the axial support of the rotors is extremely important and thus the bearing(s) between the stator and rotor need to provide a strong and stable reaction to this force. If the rotors are perfectly located on either side of the stator, there is a net axial force of zero, but to achieve this requires tight build tolerances and a stiff bearing assembly. However, by mounting the rotor directly inside the stator as described herein, that accuracy is achievable within reasonable cost. The flange 162 against which the bearings seat and locate, axially, is critical in this regard.

Indeed, with reference to FIGS. 8 and 11, there are certain geometrical features of an embodiment of a machine according to one aspect of the present invention. As mentioned above the coils 112 have an external radius $R_2$. By that is meant the radius of the smallest circle that encompasses all the coils. Likewise, they have an internal radius $R_1$, which correspondingly is the radius of the largest circle that fits within the confines of all the coils. The coils are sensibly arranged in a circle around the rotor axis 120, but that is not absolutely required. However, the radius r of the bearings 164*a,b*, being here the radius of the circle just touching the innermost part of the rolling elements of the bearings, is arranged as large as possible and is preferably related to stator radius $R_1$ by the expression:

$$r = k_1 * R_1$$

where $k_1$ is between 0.5 and 0.9 in value.

Indeed, the coils have radial ($C_1$) and circumferential ($C_2$) extents, where $$C_1 = R_2 - R_1.$$

Although the circumferential extent can be anything, it is defined as the centre-to-centre arc, centred on the rotor axis 120, between adjacent coils. However, one convenient motor has the following relationships:

$$R_1 = k_2 * R_2; \text{ and}$$

$$C_1 = k_3 * C_2$$

Where $k_2$ is between 0.5 and 0.8, and $k_3$ is between 0.75 and 2.0.

In fact, the relationship may be taken further such that:

$r = k*R_2$, where $k = *k_1 k_2$.

k preferably has a value between 0.3 and 0.6, and may be about 0.45 in one suitable arrangement.

Although the bearings 164a,b are shown as ball bearings having their own races, the design permits bearing surfaces to be formed on respective frusto-conical or cylindrical surfaces of the inner stator housing 146 and cylindrical flanges 166, and for taper roller bearings, confined to a cage, to be disposed between them. This can result in even tighter tolerances being achieved. As mentioned above, the rotor components are constructed from a ferromagnetic material such as steel and may be cast or forged and machined as required. However, the inner stator housing 146, and indeed the motor housing 102, is conveniently cast from non-magnetic material such as aluminium (alloy). Even aluminium can have a hardened bearing surface however. In this event, a flange 162 is not employed. In any event, the present design enables an air gap in the order of 1.0 mm (±0.1 mm) to be maintained at minimum manufacturing cost.

As mentioned above, the two motors 100a,b are independent. The rotors 114 are not connected to each other. However, they clearly could be, by disposing an appropriate spacer between them, and extending the bolts 170 so that they pass through both rotors. Indeed, there is nothing to prevent further motors being added in series, so that three or more motors could be employed in tandem. As can be seen in the drawings, the sides of the composite motor are closed by covers 178 that are a press fit inside internally-cylindrical extensions 102c,d of the motor housings 102. The covers are dished pressings and are a press fit inside the extensions 102c,d although other methods of fixing are conceivable. They have a central opening through which a motor out put 190 extends.

The output 190 comprises any suitable component and may be a shaft. Here, it is shown as a standard drive hub having a tripod-cup 192 for reception of a shaft (not shown) having a three-lobed yoke. A seal (not shown) would normally be disposed between the cover 178 and the hub 190 to isolate the internal environment of the motor 100. The hub 190 is connected by an annular disc 194 to the rotor 114. The disc 194 is secured to the rotor by the bolts and nuts 170, and to the hub 190 by bolts (not shown) in apertures 196 in the hub 190. Indeed, it is an aspect of the direct mounting of the rotor on the stator that the output configurations possible without any disturbance of the motor design is possible. Thus, the shaft-less topology allows for a wide variety of output configurations, including:

Automotive "constant velocity" (CV) joint housing;
Splined shaft (either male or female); and
Flat drive plate with any hole pattern.

In one application, in which the motor 100 illustrated in FIGS. 7 to 13 is particularly intended, the motor is arranged to drive two vehicle wheels. A further motor could be arranged to drive other pairs of wheels in multi-axle vehicles. The motor would be arranged substantially centrally between the wheels with drive shafts extending from each of the two drive hubs 190a,b. There would be no requirement for any differential, because each motor-slice could be driven independently with constant torque. The machine in this arrangement may operate as both a motor and a generator, particularly in hybrid vehicles, but certainly at least when employing regenerative braking.

As is evident from the description above, the covers 178 are merely dust excluders and protect the internal components of the machine 100. They have little if any structural role. The structural connections between a fixture (such as a vehicle in which the machine is disposed) and the output are as follows. The fixture is connected to the motor housing. The motor housing structurally mounts the stator. The stator structurally, although also rotationally, mounts the rotor. The rotor structurally mounts the output, which is not otherwise structurally supported by the motor housing. Here, the term "structurally" is being used in the sense that the mountings are the main or only mountings for the component in question. In many known scenarios, for example, a housing mounts a stator and also (rotationally) mounts a rotor. It could be suggested therefore that the stator mounts the rotor. However, such mounting is incidental and is not what is meant herein by structural mounting through the substantially exclusive agency of the component in question. Of course, in that regard, a seal disposed between the cover 178 and the hub 190 neither "mounts" the hub on the cover, let alone structurally, and does not disturb the fundamental structural mounting of the hub in the housing through the agency of the rotor and stator.

It can be seen that by mounting the rotor directly on the stator at a distance from the rotation axis, a substantial hollow space is created inside the rotor. Depending on the application, this provides an opportunity to dispose a gearbox, particularly a planetary gearbox, inside the motor. To some extent, in many circumstances with a machine of the present design, a gear box is not necessary because the electronics required to manage the coils can enable the machine to operate at a substantially constant maximum torque (subject substantially only to cooling limitations) over a wide range of speeds, for example torques of 500 Nm per motor slice, to rotational speeds in excess of 3000 rpm, are feasible. Nevertheless, this option is distinctly available.

This arrangement also has the advantage of facilitating interconnection of machines in tandem, because there is no requirement to disturb the journal arrangement of the rotor in the housing as would normally be the case where the rotor is supported in bearings fixed in the housing. Clearly, there is some scope for debate as to where a stator begins and a housing in which it is fixed ends. Indeed, the invention provides, in motor terms the following non-exclusive list of options:

(a) A single 500 Nm slice with a spline output;
(b) Two independently-controlled 500 Nm slices, each with their own CV-type output for automotive applications;
(c) Four slices joined as two pairs (1000 Nm per pair), each pair with a CV-type output, again potentially for (high performance) automotive applications;
(d) Four slices fixed rigidly together giving 2000 Nm;

Reference is made to FIG. 8, in which the bottom half differs from the top half of the drawing by virtue of the rotors 114a,b being interconnected by bolts 170a that extend through aligned bosses, although spaced by spacer sleeve 169. In fact, there is no reason why there should not be two outputs, as previously described, provided no differential is required, but in the lower half of FIG. 8, left-hand cover 178' is completely closed, and left-hand rotor 114a does not have a disc 194 and hub 190 connected to it. Instead drive is to (or from) a single hub 190 and disc 194 connected to the right-hand rotor 114b. Indeed, the four slice motor (not shown) can be made simply by continuing the addition of rotors 114 leftwardly in FIG. 8. Alternatively, a dual-drive four-slice motor can be achieved simply by mirroring the arrangement in the bottom half of FIG. 8, removing the continuous covers 178' and connecting the annular housings 102 of each pair together.

Another element to note is that a slice doesn't necessarily have to be a further motor slice 100a,b—it could be a separate gearbox slice to provide an alternative torque-speed balance. So, in example (a) above, the slice could be added to an epicyclic gearbox that steps the rotational speed down by, for example, a factor of 4:1. This would reduce the maximum output speed but will conversely give 2000 Nm torque (500 Nm×4) from a very light weight assembly. Of course, these figures apply to the topology illustrated in FIGS. 7 to 13 employing 18 stator poles and 20 magnets per rotor. However, other options are of course available, in either direction, down to 300 Nm and upwards of 1000 Nm.

Although the motor 100 of FIGS. 7 to 13 is shown without the features of the embodiments described above with reference to FIGS. 4 to 6, those features can advantageously be incorporated, as desired. Of course, the embodiments described with reference to FIGS. 4 and 5 are mutually exclusive.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

REFERENCES

[1] T J Woolmer and M D McCulloch "Analysis of the Yokeless and Segmented Armature Machine", International Electric Machines and Drives Conference (IEMDC), 3-5 May 2007

The invention claimed is:

1. A shaftless electric machine comprising a stator and a rotor mounted for rotation about a rotor axis with respect to the stator, permanent magnets being carried by the rotor, an output on the rotor, the stator comprising coils wound on stator bars for interaction with the magnets of the rotor, the rotor having two stages arranged one at either end of the stator bars, with air gaps between the ends of the bars and the rotor stages, an annular housing retaining and mounting the stator; a bearing radially between the rotor and stator, the rotor being hollow around said rotor axis, said output comprising flange connection means and a flange by which the flange is connectable to the rotor for transmitting rotary power to or from the rotor, wherein the entire load between the output and the annular housing is transmitted through the bearing between the stator and rotor, whereby no other mounting of the rotor or its output with respect to the annular housing is provided, and the rotor stages each comprise an inner radial portion and an outer radial portion, the outer radial portion being spaced axially further away from the stator than the inner radial portion, the outer radial portion having an annular section on which are mounted said permanent magnets, the inner radial portions of the rotor stages are connected together such that the rotor stages and said stator enclose said bearing and the bearing is mounted on the inner radial portions of the rotor stages.

2. The electric machine as claimed in claim 1, in which there are at least two significant magnetic flux paths of the motor: a first passing through a first stator bar, across a first of the air gaps, through a first magnet on a first stage of the rotor into a back iron of the first stage, into an adjacent second magnet, across the first air gap into a second stator bar adjacent the first, across the second air gap, through a third magnet on second stage of the rotor into a back iron of the second stage, into an adjacent fourth magnet, across the second air gap and back into the first stator bar; and a second path passing through the first stator bar, across the first air gap and through the first magnet on the first stage and into the back iron of the first stage, through the first stage into the second stage of the rotor around said bearing into the back iron of the second stage, into the fourth magnet, across the second air gap and back into the first stator bar.

3. The electric machine as claimed in claim 1, in which the stator coils are spaced around the rotor axis and said stator coils approach the rotor axis no closer than a first, stator radius ($R_1$) of the stator; and the bearing comprises rolling elements rolling on an inner race of said bearing, the inner race of the bearing being mounted to a surface of the rotor that is no closer to the rotor axis than a second, rotor radius (r), which rotor radius is between 60% and 90% of the stator radius.

4. The electric machine as claimed in claim 3, in which the stator coils have a radial extent ($C_1$) such that the smallest circle enclosing the stator coils has a coil radius ($R_2$) where the stator radius ($R_1$) is between 50% and 80% of the coil radius ($R_2$) and the radial extent is equal to the difference of the coil radius and the stator radius ($C_1=R_2-R_1$).

5. The electric machine as claimed in claim 4, in which the coils have a circumferential extent ($C_2$) that is between 50% and 150% of the radial extent.

6. The electric machine as claimed in claim 1, in which the bars are axially aligned with the rotation axis of the rotor, the bearing being between two radial planes that intersect said air gaps.

7. The electric machine as claimed in claim 1, in which said air gaps are axial air gaps extending in a radial direction.

8. The electric machine as claimed in claim 1, in which the bearing is between two radial planes that intersect the coils, bars or a shoe of the stator.

9. The electric machine as claimed in claim 1, in which the bearing is between two radial planes that intersect the coils of the stator.

10. The electric machine as claimed in claim 1, in which the bars and coils thereon are enclosed by a stator housing that extends between the air gaps and defines a chamber incorporating cooling medium to cool the coils.

11. The electric machine as claimed in claim 10, in which said stator housing comprises two annular plates and two cylindrical walls, the annular plates including recesses to locate the bars within the chamber.

12. The electric machine as claimed in claim 10, in which the material of the stator housing is non-magnetic and electrically non-conducting.

13. The electric machine as claimed in claim 10, in which the material of the stator housing in the air gaps is heat insulating.

14. The electric machine as claimed in claim 10, in which said stator housing is thinned at the ends of the bar to minimize the gap between the bars and the magnets on the rotor.

15. The electric machine as claimed in claim 11, in which said cylindrical walls are aluminium and said annular plates are plastics material.

16. The electric machine as claimed in claim 11, in which said cylindrical walls are a radially inner and a radially outer wall, said radially outer wall comprising a portion of said annular housing and having means to mount the machine and said inner wall mounting said bearing.

17. The electric machine as claimed in claim 1, in which each said inner radial portion comprises a cylindrical flange with an interface for mutual inter-engagement.

18. The electric machine as claimed in claim 17, further comprising a spacer between the cylindrical flanges to adjust preload on the bearing.

19. The electric machine as claimed in 17, in which said cylindrical flanges include bosses arranged parallel said rotor axis to receive fasteners for clamping said rotor stages together.

20. The electric machine as claimed in claim 1, in which said flange connection means comprises an annular axial face of the rotor including fasteners for connection of said flange.

21. The electric machine as claimed in claim 20, in which the flange comprises a disc and a hub.

22. The electric machine as claimed in claim 20, in which said disc is connectible by said fasteners to bosses of the rotor.

23. The electric machine as claimed in claim 1, in which the bearing comprises two bearings, one on either side of a flange on the stator, whereby axial location of the rotor stages with respect to the stator is determined.

24. The electric machine as claimed in claim 1, in which said annular housing has axial interfaces enabling at least two such machines to be connected together sharing a common rotor axis.

25. The electric machine as claimed in claim 24, in which the bearing comprises two bearings, one on either side of a flange on the stator, whereby axial location of the rotor stages with respect to the stator is determined and the rotors of the connected machines are interconnected by fasteners passing through bosses of adjacent rotors of adjacent machines, a spacer being disposed between them.

26. The electric machine as claimed in claim 1, in which the exposed ends of the machine are closed by covers fitted on the annular housing, at least one having a central aperture through which said output is adapted to extend.

27. The electric machine as claimed in claim 1 being a motor.

28. The motor as claimed in claim 27, in which the bearing comprises two bearings, one on either side of a flange on the stator, whereby axial location of the rotor stages with respect to the stator is determined and at least two of the motors are connected side by side, at least two of which have independent rotors, each provided with its own output.

29. A motor as claimed in claim 24, in which the bearing comprises two bearings, one on either side of a flange on the stator, whereby axial location of the rotor stages with respect to the stator is determined and the rotors of the connected machines are interconnected by fasteners passing through bosses of adjacent rotors, a spacer being disposed between them and each cover is provided with said central aperture through which the two outputs extend.

30. A vehicle, comprising the motors as claimed in claim 28 and a driveshaft from each output to wheels on different sides of the vehicle.

* * * * *